(12) United States Patent
Fujikata et al.

(10) Patent No.: US 10,146,070 B2
(45) Date of Patent: Dec. 4, 2018

(54) OPTICAL MODULATOR AND METHOD OF MANUFACTURING SAME

(71) Applicants: PHOTONICS ELECTRONICS TECHNOLOGY RESEARCH ASSOCIATION, Tokyo (JP); THE UNIVERSITY OF TOKYO, Tokyo (JP)

(72) Inventors: Junichi Fujikata, Tokyo (JP); Shigeki Takahashi, Tokyo (JP); Mitsuru Takenaka, Tokyo (JP); Younghyun Kim, Tokyo (JP)

(73) Assignee: PHOTONICS ELECTRONICS TECHNOLOGY RESEARCH ASSOCIATION, Tokyo (JP)

( * ) Notice: Subject to any disclaimer, the term of this patent is extended or adjusted under 35 U.S.C. 154(b) by 0 days.

(21) Appl. No.: 15/548,687

(22) PCT Filed: Feb. 2, 2016

(86) PCT No.: PCT/JP2016/053001
§ 371 (c)(1),
(2) Date: Aug. 3, 2017

(87) PCT Pub. No.: WO2016/125772
PCT Pub. Date: Aug. 11, 2016

(65) Prior Publication Data
US 2018/0024410 A1    Jan. 25, 2018

(30) Foreign Application Priority Data

Feb. 6, 2015  (JP) .................. 2015-022351

(51) Int. Cl.
*G02F 1/015* (2006.01)
*G02F 1/025* (2006.01)
(Continued)

(52) U.S. Cl.
CPC .............. *G02F 1/015* (2013.01); *G02F 1/025* (2013.01); *G02F 1/225* (2013.01); *G02B 6/12* (2013.01);
(Continued)

(58) Field of Classification Search
CPC ...... G02F 1/015; G02F 1/025; G02F 1/01708; G02F 2001/0151–2001/0158
(Continued)

(56) References Cited

U.S. PATENT DOCUMENTS 6,897,471 B1 * 5/2005 Soref .................... B82Y 20/00
  257/14
6,978,067 B2 * 12/2005 Herbert ................. B82Y 20/00
  257/186
(Continued)

FOREIGN PATENT DOCUMENTS

JP   2011-076053 A    4/2011
JP   2012-521576 A    9/2012
(Continued)

OTHER PUBLICATIONS

"High speed carrier-depletion modulators with 1.4 V*cm V_L integrated on 0.25 _m silicon-on-insulator waveguides" by Feng et al, Optics Express, vol. 18, No. 8, pp. 7994-7999, 2010.*
(Continued)

*Primary Examiner* — Robert Tavlykaev
(74) *Attorney, Agent, or Firm* — Michael Best & Friedrich LLP

(57) ABSTRACT

An optical phase modulator 100 according to an embodiment of this disclosure comprises a rib-type waveguide structure 110 comprising: a PN junction 106 comprising Si and formed in a lateral direction on a substrate; and a $Si_{1-x}Ge_x$ layer 108 that is doped with a p-type impurity and comprises at least one layer laminated on the PN junction (Continued)

106, so as to be electrically connected to the PN junction 106.

14 Claims, 32 Drawing Sheets

(51) Int. Cl.
  *G02F 1/225* (2006.01)
  *G02B 6/12* (2006.01)
  *G02B 6/122* (2006.01)
  *G02F 1/21* (2006.01)

(52) U.S. Cl.
  CPC ...... *G02B 6/122* (2013.01); *G02F 2001/0151* (2013.01); *G02F 2001/212* (2013.01); *G02F 2201/12* (2013.01); *G02F 2202/10* (2013.01)

(58) Field of Classification Search
  USPC .......................................... 385/1–3
  See application file for complete search history.

(56) References Cited

U.S. PATENT DOCUMENTS

| | | | |
|---|---|---|---|
| 7,251,408 B1* | 7/2007 | Gunn, III | G02F 1/025 385/132 |
| 7,289,688 B2* | 10/2007 | Bull | G02B 6/126 359/489.03 |
| 2012/0033910 A1 | 2/2012 | Morini et al. | |
| 2012/0189239 A1 | 7/2012 | Tu et al. | |
| 2013/0051725 A1* | 2/2013 | Shinoda | G02F 1/13471 385/14 |
| 2016/0291350 A1 | 10/2016 | Fujikata et al. | |

FOREIGN PATENT DOCUMENTS

| | | |
|---|---|---|
| JP | 2013-214044 A | 10/2013 |
| WO | WO-2014/155450 A1 | 10/2014 |

OTHER PUBLICATIONS

"Pockels effect based on fully integrated, strained silicon electro-optic modulator" by Chmielak et al, Optics Express, vol. 19, No. 18, pp. 17212-17219, 2011.*

"Strained silicon as a new electro-optic material" by Jacobsen et al, Nature, vol. 441, pp. 199-202, 2006.*

"Two-dimensional micro-Raman mapping of stress and strain distributions in strained silicon waveguides" by Bianco et al, Semiconductor Science and Technology, vol. 27, 085009, 2012.*

W. Green et al., "Ultra-compact, low RF power, 10Gb/s silicon Mach-Zehnder modulator", Dec. 6, 2007, Optics Express, vol. 15, No. 25, 17106-171113 (8 pages), Optical Society of America, USA.

J. Fujikata et al., "High Performance PIN Ge Photodetector and Si Optical Modulator with MOS Junction for Photonics-Electronics Convergence System", Jan. 22, 2013, Design Automation Conference (ASP-DAC), 2013 18th Asia and South Pacific, p. 655-656 (2 pages), IEEE.

J. Fujikata et al., "25 GHz Operation of Silicon Optical Modulator with Projection MOS Structure", Mar. 21, 2010, Optical Fiber Communication (OFC), collocated National Fiber Optic Engineers Conference, 2010 Conference on (OFC/NFOEC), p. 1-3 (3 pages), IEEE.

Y. Kim et al., "Fabrication and evaluation of propagation loss of Si/SiGe/Si photonic-wire waveguides for Si based optical modulator", Apr. 30, 2014, Thin Solid Films, vol. 557, p. 342-345 (4 pages), https://doi.org/10.1016/j.tsf.2013.10.063, Elesevier B.V.

Y. Kim et al., "Strain-induced enhancement of plasma dispersion effect and free-carrier absorption in SiGe optical modulators", Apr. 15, 2014, Scientific Reports, vol. 4, 4683, p. 1-6 (6 pages), DOI: 10.1038/srep04683, Macmillan Publishers Limited.

Y. Kim et al., "Low temperature $Al_2O_3$ surface passivation for carrier-injection SiGe optical modulator", Mar. 24, 2014, Optics Express, vol. 22, No. 7, 7458-7464 (7 pages), DOI: 10.1364/OE.22.007458, Optical Society of America, USA.

Y. Kim et al., "Strain Engineering of Plasma Dispersion Effect for SiGe Optical Modulators", IEEE Journal of Quantum Electronics, vol. 48, No. 1, p. 8-16 (9 pages), Jan. 2012, IEEE.

Y. Kim et al., "SiGe-based carrier-injection Mach-Zehnder modulator with enhanced plasma dispersion effect in SiGe", Mar. 24, 2015, 2015 Optical Fiber Communication Conference and Exhibition (OFC2015), Tu2A.7, Los Angeles, p. 1 & 368-370 (4 pages), DOI: 10.1364/OFC.2015.Tu2A.7, IEEE.

Y. Kim et al., "Low Injection-current Variable Optical Attenuator by using strained SiGe with Optimized Lateral PIN junction", Nov. 18, 2014, 4th International Symposium on Photonics and Electronics Convergence (ISPEC2014), p. 54, p. 100 (1 page), Tokyo.

Y. Kim et al., "Record-low Injection-current Strained SiGe Variable Optical Attenuator with Optimized Lateral PIN Junction", Sep. 24, 2014, European Conference on Optical Communication (ECOC'14), Cannes, p. 2.6, p. 1/3-3/3 (3 pages), DOI: 10.1109/ECOC.2014.6963927.

Y. Kim et al., "Simulation of carrier-depletion strained SiGe optical modulators with vertical p-n junction," Aug. 28, 2014, International Conference on Group IV Photonics (GFP2014), ThP5, Paris, France, p. 1 & 153-154 (3 pages), DOI: 10.1109/Group4.2014.6961993, IEEE.

Y. Kim et al., "Strain-induced enhancement of free-carrier effects in SiGe for optical modulator and VOA applications", Mar. 13, 2014, Optical Fiber Communication Conference (OFC2014), Th1C.4, San Francisco, p. 1 & 456-458 (4 pages), DOI: 10.1364/OFC.2014.Th1C.4, IEEE.

Y. Kim et al., "Low temperature $Al_2O_3$ surface passivation for carrier injection type Si/strained SiGe/Si waveguide modulator," Nov. 19, 2013, 3rd International Symposium on Photonics and Electronics Convergence (ISPEC2013), p. 41, p. 93 (1 page), Tokyo.

Y. Kim et al., "Low temperature surface passivation for carrier injection type SiGe optical modulator," Aug. 29, 2013, International Conference on Group IV Photonics (GFP2013), ThD4, Seoul, South Korea, p. 1 & 99-100 (3 pages), IEEE.

Y. Kim et al., "Simulation of Si/SiGe/Si double heterostructure based carrier-injection modulator," Dec. 2012, 2nd International Symposium on Photonics and Electronics Convergence (ISPEC'12), p. 2, p. 52 (1 page), Tokyo.

Y. Kim et al., "Numerical analysis of strained SiGe-based carrier-injection optical modulators," Aug. 2012, International Conference on Group IV Photonics (GFP2012), WP18, San Diego, p. 1 & 126-128 (4 pages), IEEE.

J. Fujikata et al., "Study on Depletion Type Si Optical Modulator, Using Strained SiGe Layer", Mar. 12, 2015, The 62nd JSAP Spring Meeting, 12a-A16-11 (Tokai University), p. 04-240 (1 page), The Japan Society of Applied Physics.

K. Takeuchi et al., "Investigation of strained SiGe optical modulator with interleaved pn junction", Mar. 12, 2015, The 62nd JSAP Spring Meeting, 12a-A16-9 (Tokai University), p. 04-238, The Japan Society of Applied Physics.

Y. Kim et al., "Strain-induced enhancement of free-carrier effects in strained SiGe modulator", Mar. 19, 2014, The 61st JSAP Spring Meeting, 19a-F8-9 (Aoyama Gakuin University), p. 05-083, The Japan Society of Applied Physics.

Y. Kim et al., "Low temperature surface passivation for carrier-injection type optical modulator with Si/strained SiGe/Si waveguide core", Oct. 18, 2013, IEICE the 20th Silicon Photonics Meeting, SIPH2013-p18 (Tokyo Institute of Technology), p. 44, The Institute of Electronics, Information and Communication Engineers.

Y. Kim et al., "Low temperature surface passivation for strained SiGe optical modulator", Sep. 19, 2013, The 74th JSAP Autumn Meeting, 19a-P2-22 (Doshisha University), p. 05-022, The Japan Society of Applied Physics.

Y. Kim et al., "Fabrication of waveguide with Si/SiGe/Si core for SiGe optical modulator", Mar. 2013, The 60th JSAP Spring Meeting, 27p-PA2-9 (Kanagawa Institute of Technology), p. 05-050, The Japan Society of Applied Physics.

(56) References Cited

OTHER PUBLICATIONS

Y. Kim et al., "TCAD simulations of carrier-injection strained SiGe optical modulator", Sep. 2012, The 73rd JSAP Autumn Meeting, 13a-05-6 (Ehime University), p. 05-092, The Japan Society of Applied Physics.
International Search Report issued in Application No. PCT/JP2016/053001, dated May 10, 2016.
Levinshtein et al., "Properties of Advanced Semiconductor Materials: GaN, Aln, InN, BN, SiC, SiGe," ISBN 0-471-35827-4, John Wiley & Sons, 2001, pp. 173-176.

* cited by examiner

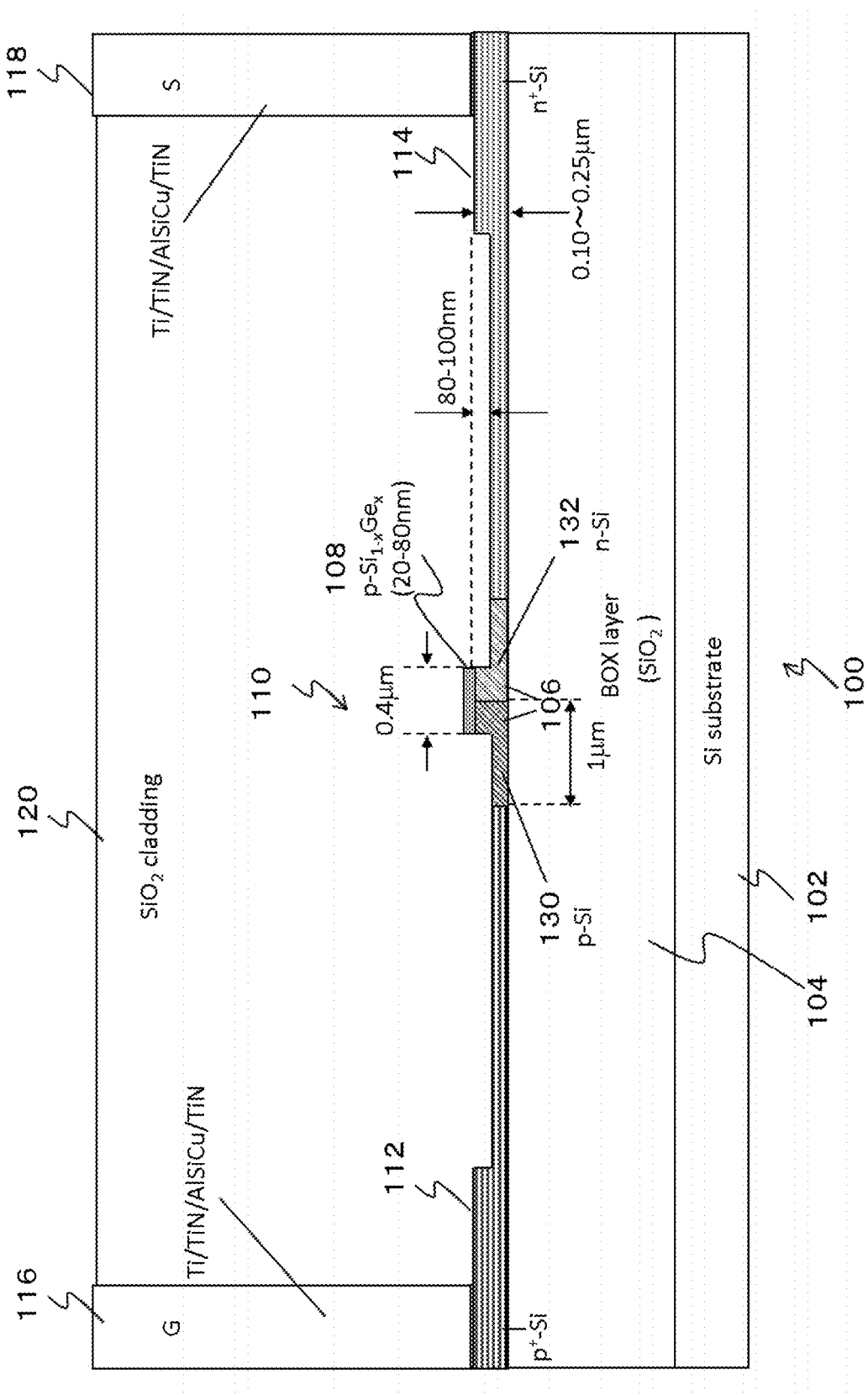

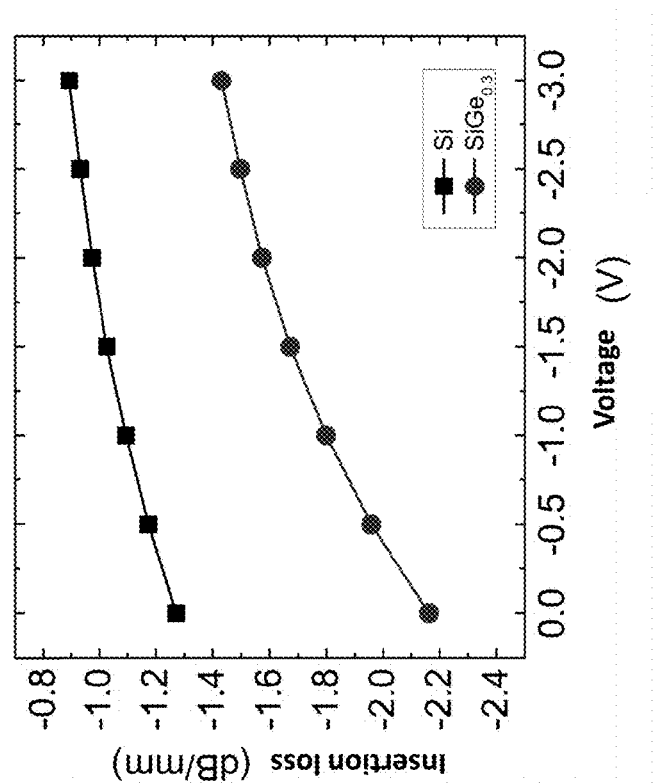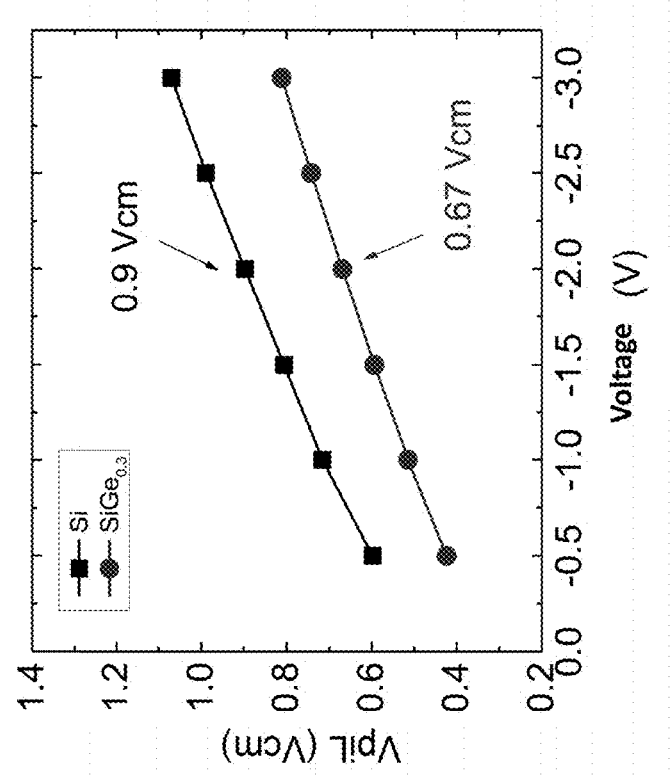
Fig. 4A
Fig. 4B

Ex profile

Enhancement of optical confinement by stacking of SiGe layer

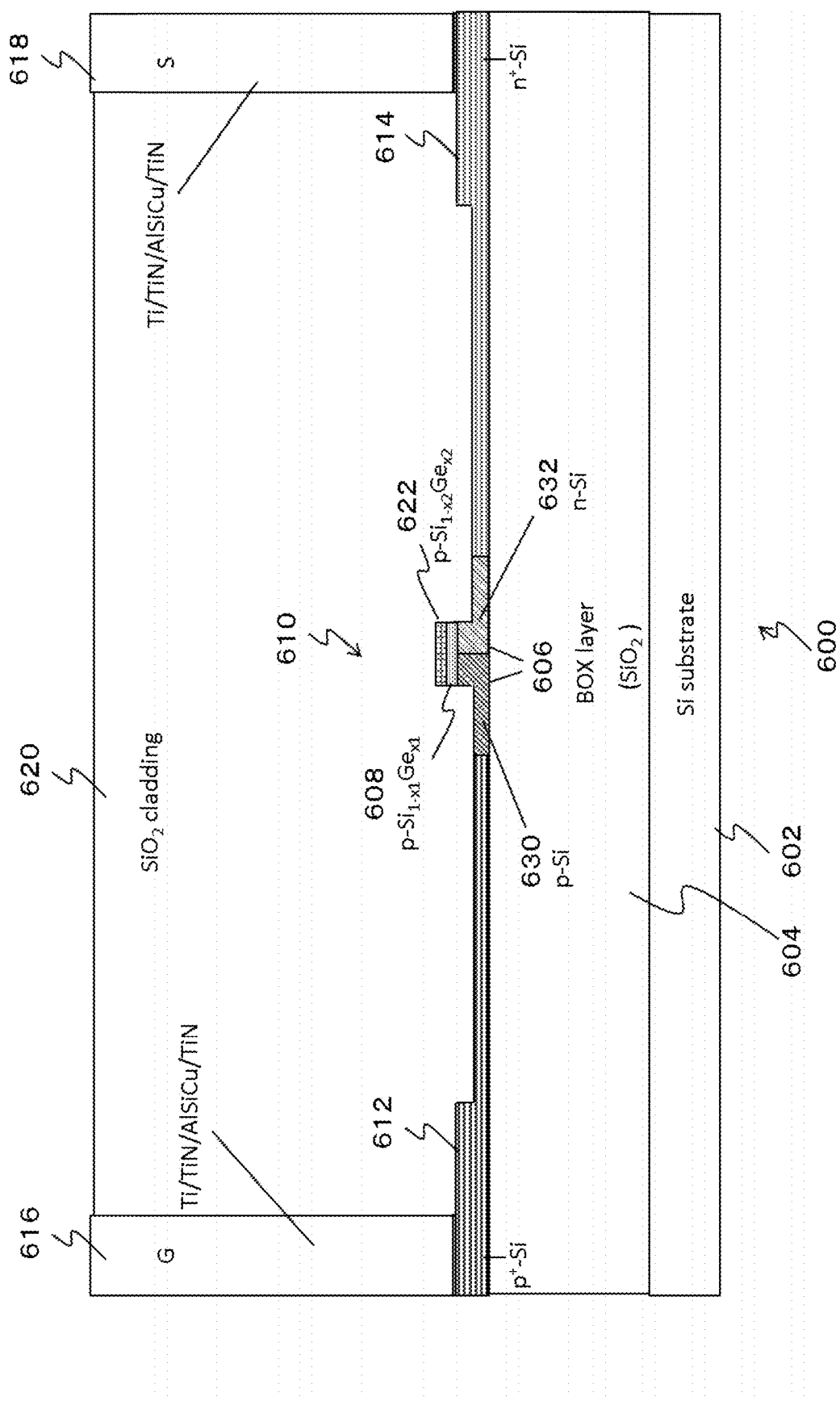

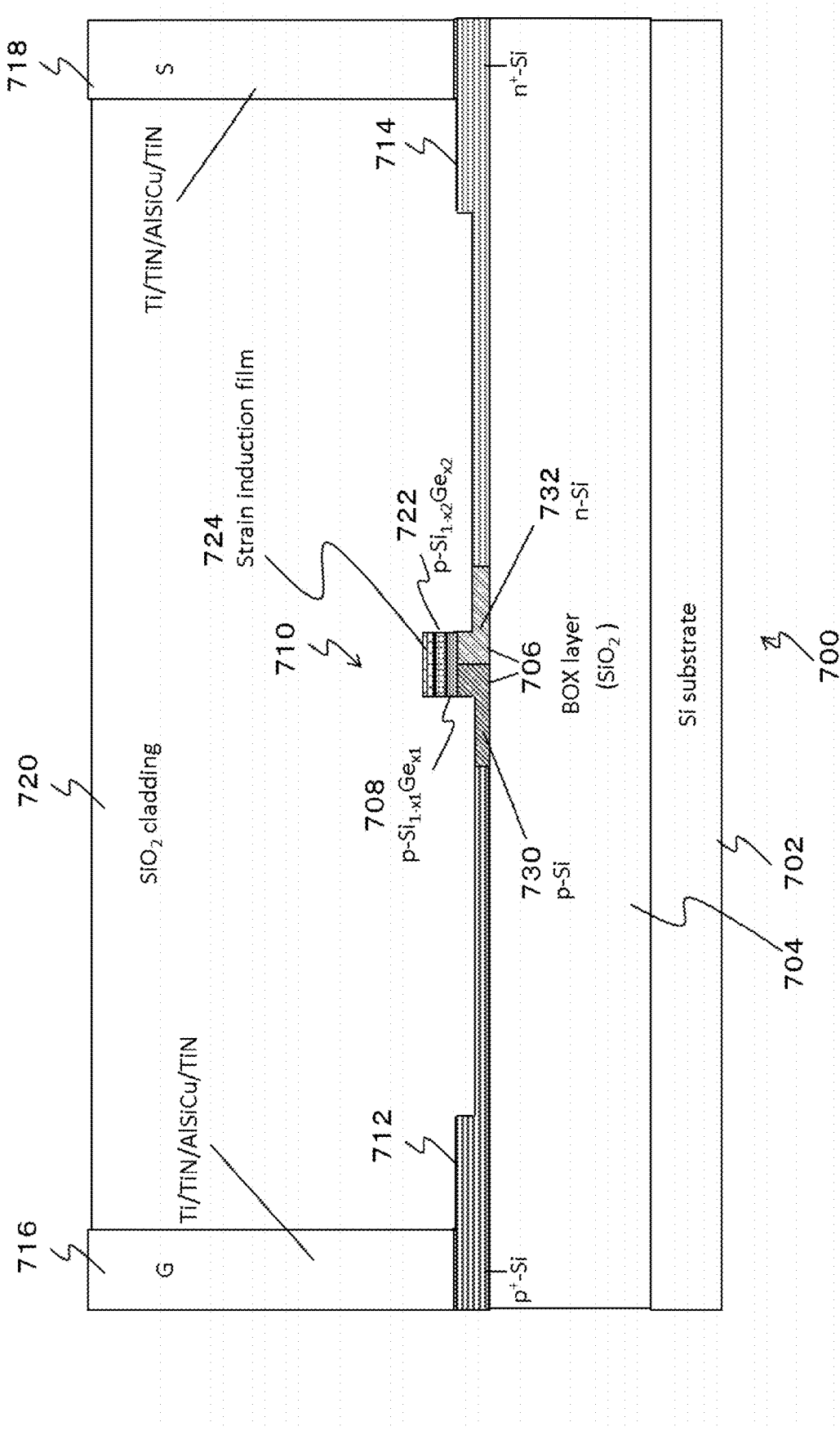

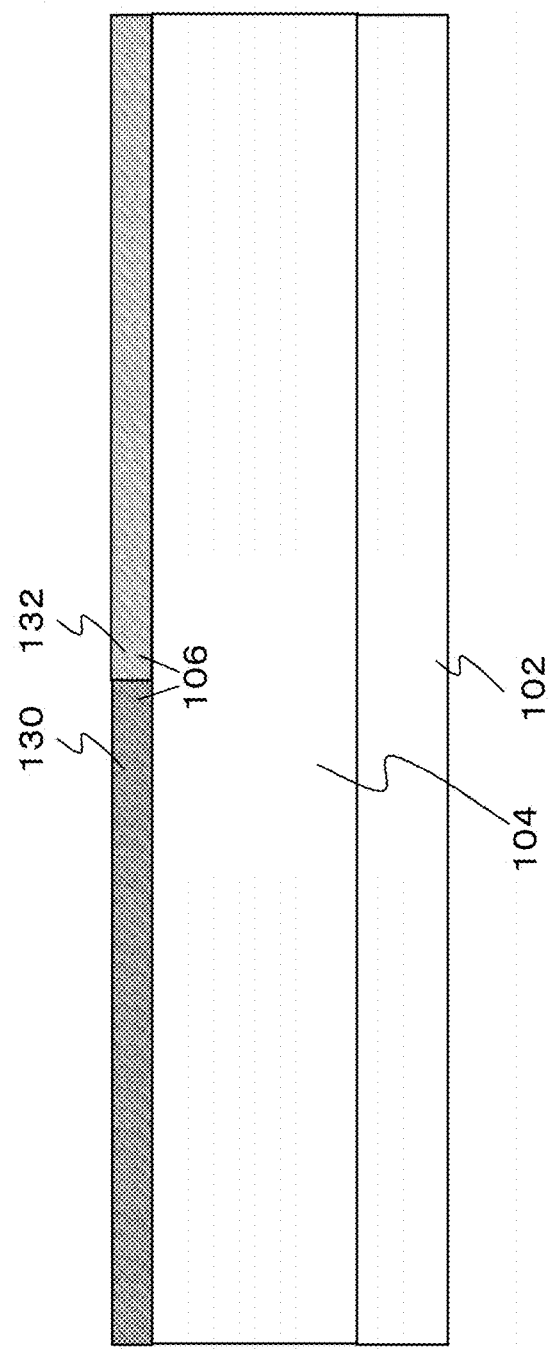

OPTICAL MODULATOR AND METHOD OF MANUFACTURING SAME

TECHNICAL FIELD

The present invention relates to optical modulators and methods for manufacturing the optical modulators, and more specifically, relates to optical phase modulators and optical intensity modulators that utilize a carrier plasma effect of silicon (Si), and methods for manufacturing these modulators.

BACKGROUND

Silicon-based optical communication devices, which function by use of optical fiber communication wavelengths of 1310 nm and 1550 nm that are used in a variety of systems such as a home-use optical fiber, a local area network (LAN), and so on, have great potential in terms of techniques that allow integration of optical function elements and electronic circuits on a silicon platform by use of a CMOS technique.

Recently, passive devices, such as a waveguide, an optical coupler, a wavelength filter, and so on which are silicon based, are studied very widely. Further, active elements, such as an optical modulator, an optical switch, and so on which are silicon based, can be listed as those that are important in the techniques used in the means for controlling optical signals used in the above communication systems; and these active elements are receiving great attention. The operation of each of an optical switch and a modulation element, which changes a refractive index by use of a thermooptic effect of silicon, is slow; thus, it can support a modulation frequency of up to 1 Mb/sec only, in terms of a device speed. Accordingly, an optical modulation element which uses an electro-optic effect is necessary, for realizing a high modulation frequency that is required in many optical communication systems.

Many of the presently suggested electro-optic modulators are devices, each of which uses a carrier plasma effect for changing density of free carriers in a silicon layer to thereby change a real part and an imaginary part of a refractive index, for changing the phase and/or the intensity of light. Pure silicon does not exhibit a linear electro-optic effect (Pockels), and change in a refractive index due to a Franz-Keldysh effect or a Kerr effect is very small; thus, the above effect is widely used. In a modulator which uses free carrier absorption, the output thereof is directly modulated in accordance with change in the degree of absorption of light propagating through Si. As a structure using change in a refractive index, a structure using a Mach-Zehnder interferometer is generally known, wherein it is possible to obtain an intensity modulation signal of light by causing interference relating to an optical phase difference between two arms to be occurred.

Free-carrier density in an electro-optic modulator can be changed by injecting, accumulating, excluding, or inverting free carriers. Many of those devices, that have been studied, have bad optical modulation efficiency, require the length on the order of millimeters for optical phase modulation, and require injection current density higher than 1 kA/cm$^3$. For realizing miniaturization/high-integration, and for further realizing low electric power consumption, an element structure that has high optical modulation efficiency is required; and, by using the element structure, the length for optical phase modulation can be reduced. Also, in the case that the size of an element is large, the element is susceptible to temperature distribution on a silicon platform; so that there may be a case that an originally existed electro-optic effect may be cancelled out by the change in a refractive index of a silicon layer due to a thermooptic effect; and this may become a problem.

FIG. 25 shows a typical example of a silicon-based electro-optic phase modulator which uses a rib waveguide shape structure formed on an SOI substrate and is disclosed in each of Patent-related Document 1 and Non-patent-related Document 1. The electro-optic phase modulator is formed by applying p-doping and n-doping processes to slab regions extending laterally along both sides of a rib shape comprising an intrinsic semiconductor region. The above rib waveguide structure is formed by use of an Si layer on a silicon on insulator (SOI) substrate. The structure shown in FIG. 25 corresponds to a PIN-diode-type modulator which has a structure such that free carrier density in the intrinsic semiconductor region is changed by applying a forward bias and a reverse bias, for using a carrier plasma effect to thereby change the refractive index. In this example, an intrinsic semiconductor silicon layer 2501 is formed to include a p-type region 2504 which is in contact with a first electrode contacting layer 2506 and is doped at high concentration. In the figure, the intrinsic semiconductor silicon layer 2501 further comprises a region 2505 that is doped at high concentration by applying an n-type doping process, and a second electrode contacting layer 2506 connected to the region 2505. In the above PIN diode structure, it is possible to apply the doping process to each of the regions 2504 and 2505 in such a manner that the region exhibits carrier density of approximately 10$^{20}$/cm$^3$. Further, in the above PIN structure, the p-type region 2504 and the n-type region 2505 are positioned at both sides of the rib 2501, respectively, with a distance between the above two regions; and the rib 2501 is an intrinsic semiconductor layer. Further, FIG. 25 shows a supporting substrate 2503, a buried oxide film layer 2503, electrode wires 2507, and an oxide cladding 2508.

Regarding an optical conversion operation, it is connected to an electric power source in such a manner that a forward bias is applied to the PIN diode by use of the first and second electrode contact layers 2506 to thereby inject free carriers into the waveguide. At that time, the refractive index of the silicon layer 2501 changes due to increase of the free carriers; and, as a result, phase modulation of the light, which is transmitted through the waveguide, is induced. In this regard, the speed of the optical modulation operation is restricted by the life of free carriers in the rib 2501 and by carrier diffusion when the forward bias is removed. A PIN-diode-type phase modulator such as that of prior art explained above usually operates at a speed around 10-50 Mb/sec when it operates under application of a forward bias. On the other hand, although it is possible to increase an operating speed by introducing an impurity into a silicon layer for shortening the life time of the carriers, there is a problem that efficiency of the optical modulation is lowered by the introduced impurity. However, the most important factor that has effect on the operation speed relates to an RC time constant; and, in this case, the electrostatic capacity (C) at the time that the forward bias is applied becomes very large, as a result of large carrier life time of carriers in the PIN junction. Theoretically, it is possible to realize a high speed operation for the PN junction by applying a reverse bias; however, a relatively high driving voltage or an element having a relatively large size is required to obtain enough optical modulation amplitude.

CITATION LIST

Patent Literature

PTL 1: JP Patent Application Public Disclosure No. 2013-214044

Non Patent Literature

NPL 1: William M. J. Green, Michael J. Rooks, Lidija Sekaric, and Yurii A. Vlasof, "Ultra-compact, low RF power, 10 Gb/s silicon Mach-Zehnder modulator," Opt. Express 15, 2007, 17106-171113

SUMMARY OF INVENTION

Technical Problem

Thus, an optical modulator, which has features such that optical loss is small, a size is small, a required voltage is low, and a high-speed operation is possible, is required.

Solution to Problem

In an embodiment of the present invention, an optical modulator comprises a rib-type waveguide structure, wherein the rib-type waveguide structure comprises: a PN junction or a PIN junction which comprises Si or $Si_{1-y}Ge_y$, and is formed in a lateral direction on a substrate; and an $Si_{1-x}Ge_x$ layer which comprises at least one layer, is doped by an impurity to exhibit a first conductivity type or a second conductivity type, and is stacked on the PN junction or the PIN junction to be electrically connected to the PN junction or the PIN junction.

In an embodiment of the present invention, the optical modulator comprises a first electrode of the first conductivity type and a second electrode of the second conductivity type which are positioned adjacent to the rib-type waveguide structure. Carrier density of the rib-type waveguide structure changes as a result of voltage supply to the first electrode and the second electrode.

In an embodiment of the present invention, the $Si_{1-x}Ge_x$ layer comprising at least one layer has a lattice strain.

In an embodiment of the present invention, the PN junction or the PIN junction formed in the lateral direction on the substrate comprises a layered structure comprising a PN junction or a PIN junction comprising Si and a PN junction or a PIN junction comprising $Si_{1-y}Ge_y$.

In an embodiment of the present invention, the PN junction or the PIN junction, which comprises the layered structure comprising Si and $Si_{1-y}Ge_y$ and formed in the lateral direction on the substrate, comprises a rib-type waveguide structure.

In an embodiment of the present invention, the $Si_{1-x}Ge_x$ layer comprising at last one layer comprises an $Si_{1-x1}Ge_{x1}$ layer stacked on the PN junction or the PIN junction, and an $Si_{1-x2}Ge_{x2}$ layer stacked on the $Si_{1-x1}Ge_{x1}$ layer, wherein x2 is smaller than x1.

In an embodiment of the present invention, the $Si_{1-x}Ge_x$ layer comprising at last one layer comprises a strain induction film formed above the $Si_{1-x}Ge_x$ layer or on a side of the $Si_{1-x}Ge_x$ layer.

In an embodiment of the present invention, in the PN junction or the PIN junction formed in the lateral direction on the substrate, or in the $Si_{1-x}Ge_x$ layer comprising at last one layer and stacked on the PN junction or the PIN junction to be electrically connected to the PN junction or the PIN junction, doping concentration of the first conductivity type is lower than doping concentration of the second conductivity type.

In an embodiment of the present invention, the first conductivity type is a p type, and the second conductivity type is an n type.

In an embodiment of the present invention, the PN junction or the PIN junction comprises a plurality of PN junctions or a plurality of PIN junctions which are formed in a periodic manner or an aperiodic manner along a direction of propagation of light.

In an embodiment of the present invention, corresponding to junction positions of the plurality of PN junctions or the plurality of PIN junctions which are formed in a periodic manner or an aperiodic manner, a conductivity type of at least one $Si_{1-x}Ge_x$ layer stacked on the PN junction or the PIN junction changes, in an alternating manner, between the first conductivity type and the second conductivity type.

In an embodiment of the present invention, an optical intensity modulator comprises the above optical phase modulator.

In an embodiment of the present invention, a method for manufacturing an optical phase modulator comprises: forming a PN junction or a PIN junction which comprises Si or $Si_{1-y}Ge_y$, and is formed in a lateral direction; doping regions adjacent to the PN junction or the PIN junction with a first conductivity type and a second conductivity type to form a first electrode of a first conductivity type and a second electrode of a second conductivity type; and forming, on the PN junction or the PIN junction, an $Si_{1-x}Ge_x$ layer that comprises at least one layer, is doped by an impurity to exhibit the first conductivity type or the second conductivity type, and is electrically connected to the PN junction or the PIN junction.

In an embodiment of the present invention, the forming the $Si_{1-x}Ge_x$ layer comprising at least one layer comprises forming a concavity in the PN junction or the PIN junction; and forming an $Si_{1-x}Ge_x$ layer comprising at least one layer on the concavity.

Advantageous Effects of Invention

According to the present invention, an optical modulator, which has features such that optical loss is small, a size is small, a required voltage is low, and a high-speed operation is possible, can be realized.

BRIEF DESCRIPTION OF DRAWINGS

FIG. 1 schematically shows a cross-section view of an optical phase modulator 100 according to an embodiment of the present invention.

FIGS. 4A and 4B show results of calculation regarding a relationship between a reverse bias voltage and a figure of merit $V_\pi L$ and a relationship between a reverse bias voltage and an insertion loss regarding the optical phase modulator shown in FIG. 2A.

FIG. 6 schematically shows a cross-section view of an optical phase modulator 600 according to an embodiment of the present invention.

FIG. 7 schematically shows a cross-section view of an optical phase modulator 700 according to an embodiment of the present invention.

FIG. 24B is a figure for explaining a process for manufacturing the optical phase modulator according to the embodiment of the present invention shown in FIG. 1.

DESCRIPTION OF EMBODIMENTS

Figure 2B:
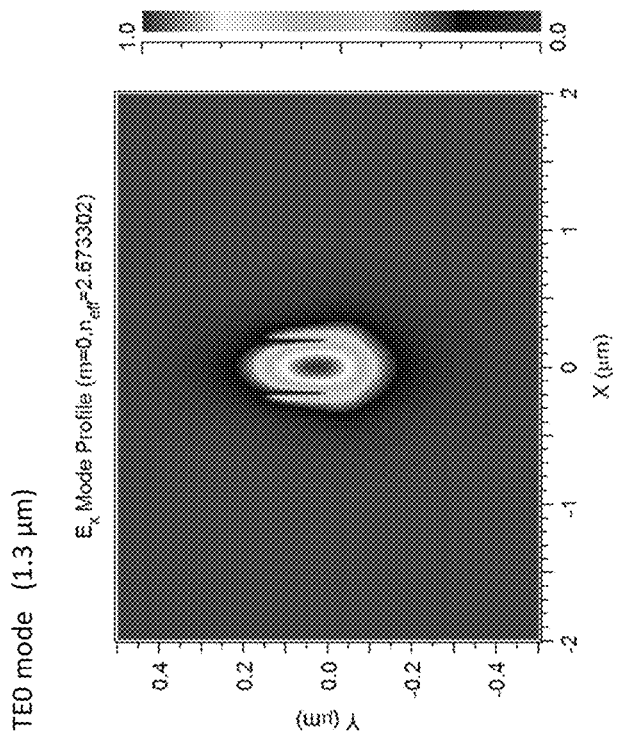
FIG. 2B shows an optical field calculated with respect to the optical phase modulator shown in FIG. 2A.

Embodiments of the present invention will be explained in the following paragraphs with reference to the figures. FIG. 1 schematically shows a cross-section view of an optical phase modulator 100 according to an embodiment of the present invention. In this embodiment, the optical phase modulator 100 is formed, by use of a silicon photonics technique, on a buried oxide film (BOX) layer 104 comprising silica glass ($SiO_2$) deposited on a silicon (Si) substrate 102. The optical phase modulator 100 comprises a rib-type waveguide structure 110. The rib-type waveguide structure 110 comprises a PN junction 106 comprising Si and formed in a lateral direction with respect to the substrate (a direction horizontal to the substrate). The PN junction 106 comprises a p-type Si region 130 and an n-type Si region 132. As will be explained later, the PN junction 106 may comprise $Si_{1-y}Ge_y$ (y is equal to or greater than 0 and equal to or less than 1). The rib-type waveguide structure 110 may comprise a PIN junction in place of the PN junction 106. Such a PIN structure may include both a PIN junction that is intentionally formed and a PIN junction that is unintentionally formed as a result of change from a PN junction to a PIN junction. The unintentional case is that an intrinsic region is formed as a result of recombination of electrons and holes due to thermal diffusion in a PN junction 106. The rib-type waveguide structure 110 also comprises a $Si_{1-x}Ge_x$ layer 108 (x is equal to or greater than 0 and equal to or less than 1) that comprises at least one layer that is deposited on the PN junction 106 and has conductivity obtained as a result of introduction of an impurity by doping. In this embodiment, the conductivity type of the $Si_{1-x}Ge_x$ layer 108 is a p type; however, it is possible to make the conductivity type of the $Si_{1-x}Ge_x$ layer 108 to be an n type. In this manner, the $Si_{1-x}Ge_x$ layer 108 has conductivity; thus, it is electrically connected to the PN junction 106.

As shown in FIG. 1, as examples, the width of the $Si_{1-x}Ge_x$ layer 108 is 0.4 μm, the thickness of the $Si_{1-x}Ge_x$ layer 108 is 20-80 nm, and the distance from the center of the PN junction to the edge of the p-type Si region 130 is 1 μm. Further, as shown in FIG. 1, as an example, the height of the PN junction in the rib-type waveguide structure 110 with respect to a slab layer is 80-100 nm. Still further, as shown in FIG. 1 as examples, the thickness of each of the electrodes 112 and 114 is 0.10-0.25 μm.

The optical phase modulator 100 also comprises a first electrode 112 of a first conductivity type (for example, a p type) and a second electrode 114 of a second conductivity type (for example, an n type) that are positioned adjacent to the rib-type waveguide structure 110, a ground electrode 116 and a signal electrode 118, and a cladding 120. The ground electrode 116 and the signal electrode 118 may comprise Ti, TiN, AlSiCu, TiN, or the like, for example. By applying a voltage to the first electrode 112 and the second electrode 114 via the ground electrode 116 and the signal electrode 118, the carrier density in the rib-type waveguide structure 110 changes.

The optical phase modulator 100 performs phase modulation of light by using a carrier plasma effect. Change of a refractive index due to a plasma dispersion effect in the carrier plasma effect can be represented by the following formula.

[Formula 1]

$$\Delta n = -\frac{e^2\lambda^2}{8\pi^2 c^2 \varepsilon_0 n}\left(\frac{\Delta N_e}{m^*_{ce}} + \frac{\Delta N_h}{m^*_{ch}}\right) \quad (1)$$

In the above formula, $\Delta n$ denotes a change in a refractive index, e denotes a unit charge, $\lambda$ denotes a light wavelength, c denotes the speed of light, $\varepsilon_0$ denotes a dielectric constant in a vacuum, n denotes a refractive index of Si, $\Delta N_e$ denotes a change in electron density, $m^*_{ce}$ denotes an effective mass of an electron, $\Delta N_h$ denotes a change in hole density, and $m^*_{ch}$ denotes an effective mass of a hole. As would be understood from formula (1), the change in the refractive index $\Delta n$ increases as the effective mass of the electron or the effective mass of the hole decreases.

Change in an optical-absorption coefficient due to free carrier absorption in the carrier plasma effect can be represented by the following formula.

[Formula 2]

$$\Delta\alpha = -\frac{e^3\lambda^2}{4\pi^2 c^3 \varepsilon_0 n}\left(\frac{\Delta N_e}{m^{*2}_{ce}\mu_e} + \frac{\Delta N_h}{m^{*2}_{ch}\mu_h}\right) \quad (2)$$

In the above formula, $\Delta\alpha$ denotes a change in an optical-absorption coefficient, $\mu_e$ denotes electron mobility, and $\mu_h$ denotes hole mobility. As would be understood from formula (2), the change in the optical-absorption coefficient $\Delta\alpha$ increases as the effective mass of the electron or the effective mass of the hole decreases.

By stacking the $Si_{1-x}Ge_x$ layer on the Si layer, a strain (lattice strain) is induced in the $Si_{1-x}Ge_x$ layer due to a difference between a lattice constant of the Si layer and a lattice constant of the $Si_{1-x}Ge_x$ layer. In the case that a strain is induced in the $Si_{1-x}Ge_x$ layer, an effective mass of a carrier becomes smaller. Thus, the effective mass of the free carrier is reduced by using the $Si_{1-x}Ge_x$ layer 108, compared with the case that a waveguide structure comprising Si only is used. Thus, as would be understood from formula (1), the carrier plasma effect can be enhanced, since the change in the refractive index due to the plasma dispersion effect becomes larger. Thus, according to this embodiment, a required degree of phase shift can be obtained by use of a distance shorter than that used in a prior-art structure; so that modulation efficiency of the optical phase modulator 100 can be improved, the size of the optical phase modulator 100 can be reduced, and the loss in the optical phase modulator 100 can be reduced. Further, since the effective mass of the free carrier is reduced, the mobility of the free carrier, which is inversely related to the effective mass, increases. Thus, according to this embodiment, a high speed operation of the optical phase modulator 100 can be realized.

Also, in the PIN junction 106 and/or the $Si_{1-x}Ge_x$ layer 108, it may be possible to set the p-type doping concentration to be lower than the n-type doping concentration. An enhancement factor of the carrier plasma effect in the case of SiGe is larger than that in the case of Si. Especially, an enhancement factor of a hole is approximately two times larger than that of an electron. Thus, by making the doping concentration of the p-type SiGe layer to be lower than that of the n-type SiGe layer, the trade-off relationship between the refractive-index difference and the absorption coefficient can be alleviated. As a result, increase of the optical-absorption coefficient can be suppressed and, therefore, a high speed operation can be realized.

The inventor of the present invention performed simulation, that will be explained later, to verify that an optical phase modulator having a p-type $Si_{1-x}Ge_x$ layer according to an embodiment of the present invention exhibits an improved performance, compared with a prior-art optical phase modulator using Si only.

Figure 2A:
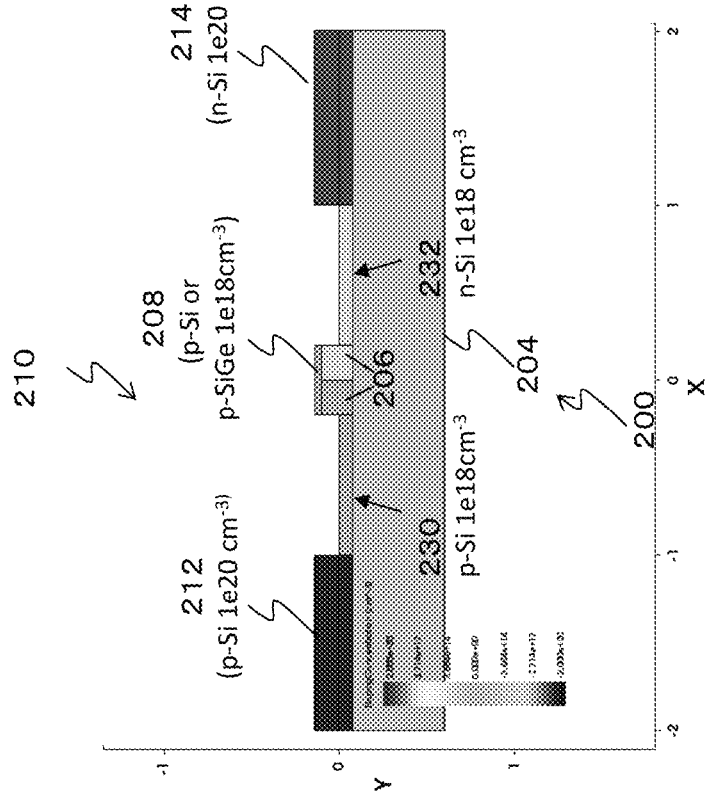
FIG. 2A shows a cross-section structure of an optical phase modulator used for simulation.

FIG. 2A shows a cross-section structure of an optical phase modulator 200 used for simulation. The optical phase modulator 200 comprises: a BOX layer 204 having a thickness of 1-3 μm; a waveguide structure 210 comprising a PN junction 206 that comprises Si and is formed on the BOX layer 204, and a p-type Si layer 208 or a p-type $Si_{1-x}Ge_x$ layer 208 (x=0.3) stacked on the PN junction 206; and a p-type electrode 212 and an n-type electrode 214 that are positioned adjacent to the waveguide structure 210. The size of each of the parts has a value that is the same as the value exemplified in the above description relating to FIG. 1. The doping concentration in the PN junction 206 is $1\times10^{18}/cm^3$. The doping concentration in each of the p-type Si layer 208 and the p-type $Si_{1-x}Ge_x$ layer 208 is $1\times10^{18}/cm^3$. The doping concentration in each of the p-type electrode 212 and the n-type electrode 214 is $1\times10^{20}/cm^3$. A semiconductor device simulator was used for calculating carrier density distribution. An optical mode was calculated by use of an electromagnetic field simulator according to a finite element method. FIG. 2B shows an optical field (a TE0 mode) calculated with respect to the optical phase modulator 200 shown in FIG. 2A.

Figure 3A:
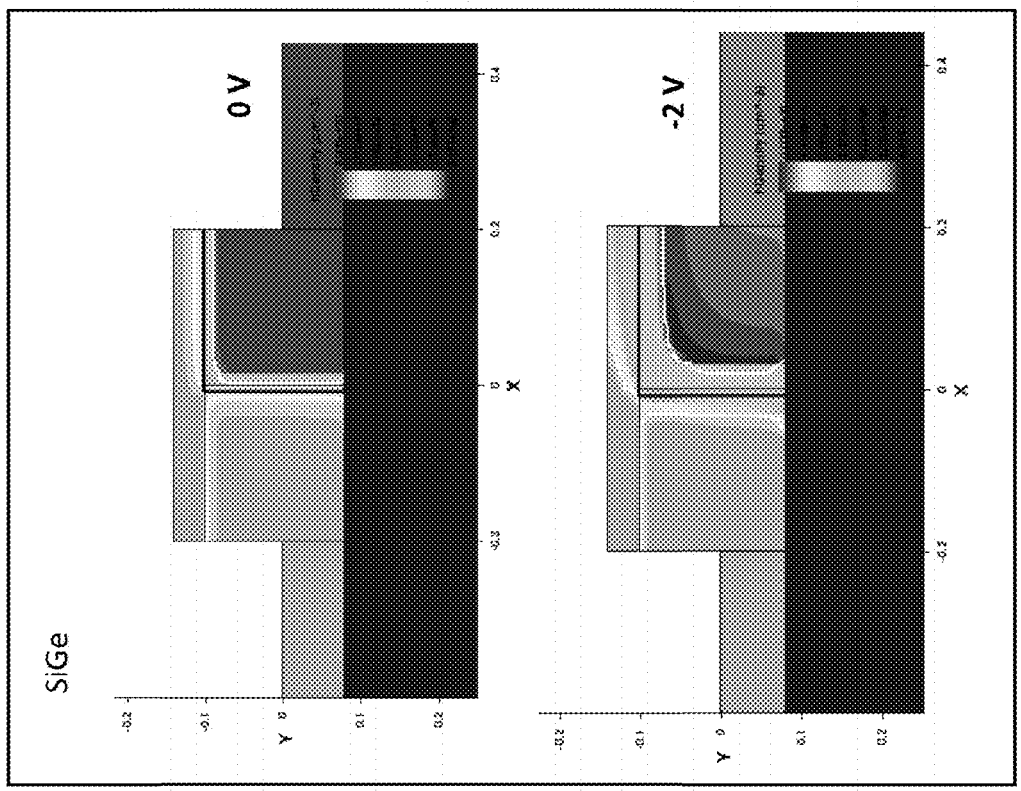
FIGS. 3A and 3B show results of calculation of carrier distribution with respect to a case of a structure wherein a p-type Si layer is stacked on a PN junction and a case of a structure wherein a p-type $Si_{1-x}Ge_x$ layer is stacked on the PN junction, respectively, when bias voltages are 0 V and −2 V.
Figure 3B:
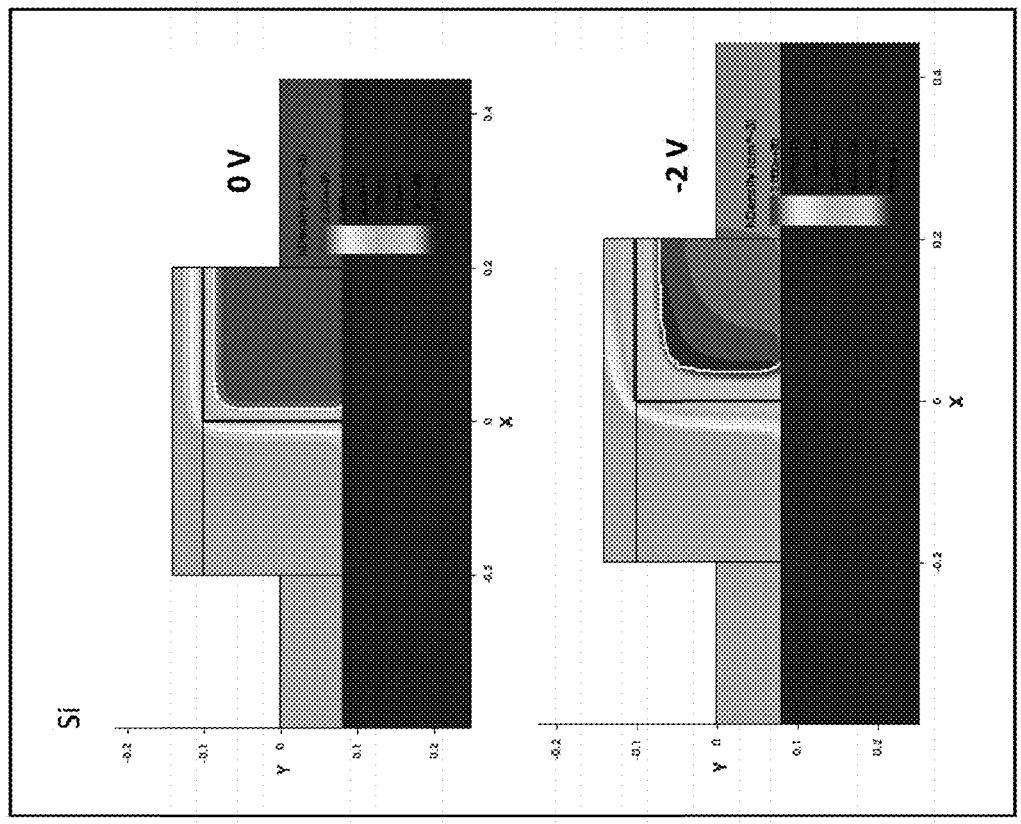

FIGS. 3A and 3B show results of calculation of carrier distribution with respect to a case of a structure wherein a p-type Si layer is stacked on a PN junction 206 and a case of a structure wherein a p-type $Si_{1-x}Ge_x$ layer is stacked on the PN junction 206, respectively, when bias voltages are 0 V and −2 V. FIG. 3A shows results of calculation in the case that a p-type Si layer is used. FIG. 3B shows results of calculation in the case that a p-type $Si_{1-x}Ge_x$ layer is used. In each of the cases shown in FIGS. 3A and 3B, a depletion layer becomes wider in the case that a reverse bias of −2 V is applied, compared with the case that the bias voltage is 0 V. According to the results shown in FIGS. 3A and 3B, the depletion layer in the case of FIG. 3B becomes slightly thick, due to band discontinuity at an interface between the p-type $Si_{1-x}Ge_x$ layer and the Si layer forming the PN junction. However, large differences between the results shown in FIGS. 3A and 3B could not be observed.

On the other hand, as described above, the carrier plasma effect is affected by the effective mass of the carrier. FIGS. 4A and 4B show results of calculation regarding a relationship between a reverse bias voltage and a figure of merit $V_\pi L$ and a relationship between a reverse bias voltage and an insertion loss, respectively, regarding the optical phase modulator 200 shown in FIG. 2A. $V_\pi L$ is a product of the length and the voltage required for shifting a phase by π in an optical phase shifter. It is considered that performance of an optical phase modulator becomes higher as $V_\pi L$ becomes smaller. As would be understood from FIG. 4A, $V_\pi L$ becomes smaller by use of the construction wherein a p-type $Si_{1-x}Ge_x$ layer is stacked on the PN junction 206, compared with the case that the construction wherein a p-type Si layer is stacked on the PN junction 206 is used, if bias voltages to be applied to the two constructions are the same. For example, as shown in FIG. 4A, in the case that the bias voltage is −2 V, $V_\pi L$=0.9 Vcm in the construction using a p-type Si layer; and, on the other hand, $V_\pi L$=0.67 Vcm in the construction using a p-type $Si_{1-x}Ge_x$ layer. Thus, the size of the modulator required to obtain a desired change in a refractive index becomes smaller by using a p-type $Si_{1-x}Ge_x$ layer, compared with the case that a Si layer only is used. Accordingly, it becomes possible to reduce the size of the optical phase modulator by using a p-type $Si_{1-x}Ge_x$ layer.

However, in the case that a p-type $Si_{1-x}Ge_x$ layer is used, an insertion loss of the optical phase modulator becomes larger. FIG. 4B show results of calculation regarding a relationship between a bias voltage and an insertion loss per 1 mm. The insertion loss becomes larger in the case that a p-type $Si_{1-x}Ge_x$ layer is used, compared with the case that an Si layer is used. Still, as explained above, since the size of the optical phase modulator can be reduced by using a p-type $Si_{1-x}Ge_x$ layer, the insertion loss of the optical phase modulator itself does not become substantially large, compared with the case that an Si layer only is used. As explained above, it is proved by the simulation that the carrier plasma effect is enhanced by using a p-type $Si_{1-x}Ge_x$ layer and, therefore, the optical phase modulator can be miniaturized.

Also, since the band gap of $Si_{1-x}Ge_x$ is smaller than that of Si, effect to confine carriers is obtained by stacking a $Si_{1-x}Ge_x$ layer. In addition, the temperature required for activation annealing for activating a doped impurities is approximately 1000° C. in the case of a Si layer; and, on the other hand, the temperature required for activation annealing is approximately 700-800° C. in the case of a $Si_{1-x}Ge_x$ layer. In the case of the construction wherein a p-type Si layer is stacked on a PN junction comprising Si, a doping process is applied to the Si layer constituting the PN junction and an activation annealing process is applied thereto, and, thereafter, a Si layer is stacked and a doping process and an activation annealing process are applied thereto. Alternatively, a doping process is applied to the Si layer constituting the PN junction, a p-type doping process is further applied to the upper Si layer, and activation annealing process is applied thereto. In the above case, the latter activation annealing is performed at a temperature of approximately 1000° C.; thus, in the case that the impurities doped by the doping process applied to the upper Si layer have reached at the PN junction, thermal diffusion of carriers will occur in the already-formed PN junction. Thus, for example, the value of $V_\pi L$=0.9 Vcm is obtained when a bias voltage is −2.0 V, in the simulation result shown in FIG. 4A; however, there may be a case wherein a value of $V_\pi L$=1.5-2.0 Vcm, which is far from the calculation result, is obtained when a device is actually manufactured and an experiment using the device is performed. This is because, as explained above, when a doping process is applied to an Si layer stacked on a PN junction and an activation annealing process is applied thereto, carriers are diffused due to thermal diffusion in the PN junction and electrons and holes are recombined, so that a layer in which carrier concentration is low is formed and, accordingly, modulation of carrier concentration cannot be adequately performed. On the other hand, in the construction such as that of the embodiment of the present invention wherein a p-type $Si_{1-x}Ge_x$ layer is stacked on a PN junction comprising Si, a doping process is applied to the Si layer constituting the PN junction and an activation annealing process is applied thereto, and, thereafter, an $Si_{1-x}Ge_x$ layer is stacked and a doping process and an activation annealing process are applied thereto. In this case, the latter activation annealing is performed at a temperature of approximately 700-800° C.; thus, even in the case that the impurities doped by the latter doping process have reached at the PN junction, the impurities in the $Si_{1-x}Ge_x$ layer only are activated and the impurities in the Si layer are not activated. Thus, according to the embodiment of the present invention, a very steep and ideal doping interface can be obtained. Accordingly, separation between a calculated value of $V_\pi L$ and an experimentally-obtained value of $V_\pi L$ becomes smaller. Thus, according to the embodiment of the present invention, $V_\pi L$ can be greatly reduced, compared with the case that a Si layer is stacked. Difference of the activation annealing temperature after the doping processes also exists in the case that $Si_{1-x}Ge_x$ layers having different compositions are used; so that, even in the case that a p-type $Si_{1-x}Ge_x$ layer having a larger Ge composition is stacked on a PN junction comprising a p-type $Si_{1-x}Ge_x$ layer having a smaller Ge composition, thermal diffusion of carriers can be suppressed and, accordingly, optical modulation efficiency close to a calculated value can be experimentally obtained.

Figure 5A:
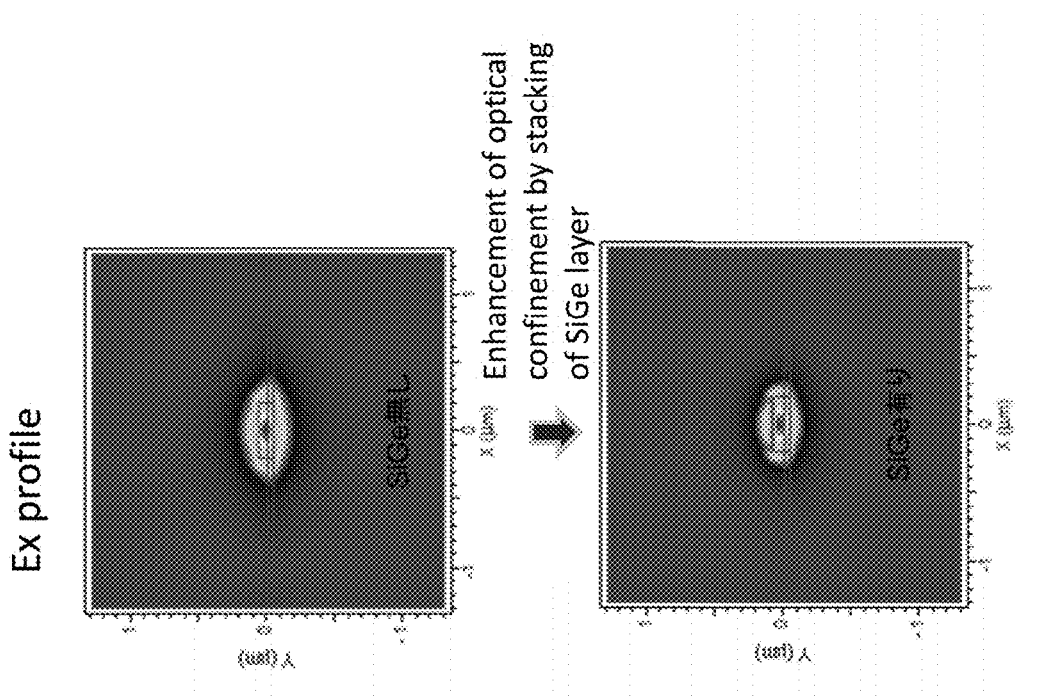
FIG. 5A shows results of calculation regarding a relationship between an excess loss of light and a distance between electrodes (highly-doped regions) regarding the optical phase modulator shown in FIG. 2A.

The refractive index of SiGe is higher than that of Si; and an effective refractive index in the rib-type waveguide structure becomes higher as the thickness of the stacked SiGe layer becomes larger, and, as a result, the expanse of an optical field can be reduced. FIG. 5A shows results of calculation regarding a relationship between an excess loss of light and a distance between an electrode layer (a highly-doped region) and a center part of the rib-type waveguide shape, with respect to the optical phase modulator 200 shown in FIG. 2A. A vertical axis of a graph shown in FIG. 5A represents excess loss of light (absorption loss of light due to an electrode), and a horizontal axis of a graph shown in FIG. 5A represents a distance between an electrode layer and a center part of the rib-type waveguide shape. In the case that no SiGe layer exists, the excess losses are approximately 12 dB/mm and approximately 4 dB/mm when the distances relating to the electrode layer are 0.4 μm and 0.6 μm, respectively. On the other hand, in the case that an SiGe layer is used, the excess losses are approximately 2.5 dB/mm and approximately 0 dB/mm when the distances relating to the electrode layer are 0.4 μm and 0.6 μm, respectively. Thus, in the case that no SiGe layer exists, the electrode layer must be positioned further away for reducing the excess loss. On the other hand, it can be understood that, by using a SiGe layer, the electrode layer can be positioned at a closer place, while suppressing the excess loss. Thus, according to the embodiment of the present invention, the distance relating to the electrode layer constituting a component of the optical phase modulator can be reduced. Accordingly, electrode leading-out resistance between the electrode layer and the optical modulation part comprising the rib-type waveguide shape is reduced, so that a CR time constant of the device can be reduced. Thus, according to the embodiment of the present invention, a high speed operation of the optical phase modulator can be realized.

Figure 5B:
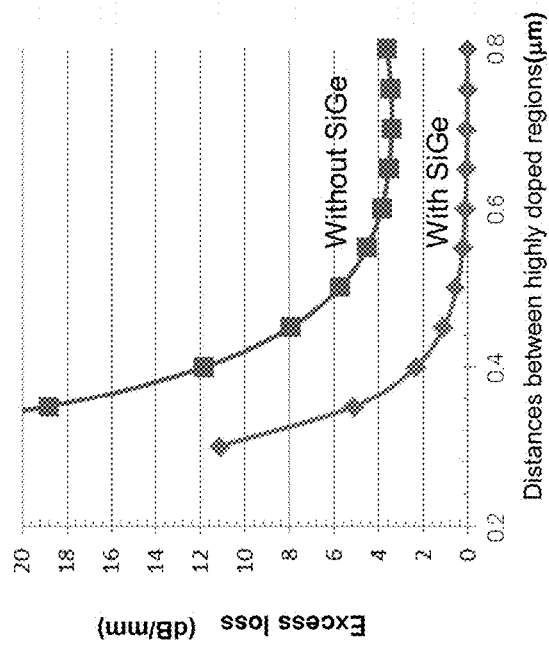
FIG. 5B shows results of calculation of optical-electric-field profiles with respect to a case that a SiGe layer is not used and a case that an SiGe layer is used, respectively.

FIG. 5B shows results of calculation of optical-electric-field intensity distribution with respect to each of a case wherein a SiGe layer is not used (the top figure in FIG. 5B) and a case wherein a SiGe layer is used (the bottom figure in FIG. 5B. The refractive index of SiGe is larger than that of Si; so that it can be understood that, by using a SiGe layer, the effect to confine light is enhanced and a mode field becomes smaller. Thus, by use of the embodiments shown in FIGS. 1 and 2, the electrode can be positioned at a place closer to the core region of the optical phase modulator. As a result, the resistance in the optical phase modulator can be reduced and the speed of the operation of the optical phase modulator can be increased.

FIG. 6 schematically shows a cross-section view of an optical phase modulator 600 according to an embodiment of the present invention. The structure of the optical phase modulator 600 is similar to that of the optical phase modulator 100 shown in FIG. 1, except that two p-type SiGe layers (a p-type $Si_{1-x1}Ge_{x1}$ layer 608 and a p-type $Si_{1-x2}Ge_{x2}$ layer 622) are stacked on a PN junction 606 in the optical phase modulator 600. It may be possible to set in such a manner that the ratio of Ge in the p-type $Si_{1-x2}Ge_{x2}$ layer 622 is smaller than that of the p-type $Si_{1-x1}Ge_{x1}$ layer 608 (i.e., x1>x2). For example, the p-type $Si_{1-x1}Ge_{x1}$ layer 608 may be a p-type $Si_{0.7}Ge_{0.3}$ layer, and the p-type $Si_{1-x2}Ge_{x2}$ layer 622 may be a p-type $Si_{0.8}Ge_{0.2}$ layer. Also, the p-type $Si_{1-x2}Ge_{x2}$ layer 622 may be a Si layer. Similar to FIG. 1, FIG. 6 shows a Si substrate 602, a BOX layer 604, a PN junction 606, a p-type Si region 630, an n-type Si region 632, a first electrode 612, a second electrode 614, a ground electrode 616, a signal electrode 618, and a cladding 620. The PN junction 606 may comprise $Si_{1-y}Ge_y$. A rib-type waveguide structure 610 may comprise a PIN junction in place of the PN junction. The conductivity type of each of the $Si_{1-x1}Ge_{x1}$ layer 608 and the $Si_{1-x2}Ge_{x2}$ layer 622 may be set to be an n type.

In the optical phase modulator 600 shown in FIG. 6, large strain can be induced by increasing the thickness of each of the p-type SiGe layers 608 and 622. However, when the thickness of the SiGe layer stacked on the Si layer reaches at a certain film thickness, an absolute degree of the strain in the SiGe layer becomes very large; and, as a result, combination at an interface between the Si layer and the SiGe layer is broken (this phenomenon is referred to as lattice relaxation). Accordingly, there is a limit in terms of the thickness of a strained SiGe layer that can be stacked (critical film thickness).

It is possible to reduce lattice defects by gradually changing the composition of the SiGe layer in the direction of film thickness. Thus, it is effective to stack a plurality of SiGe layers having different compositions. On the other hand, in the case that the Ge composition is increased, it tends to exhibit chemically unstable characteristics, such as a Ge oxide film dissolves in water, and so on. Thus, it is valuable to use a layer, which has a small Ge composition, as the top layer of the SiGe layers, since the top layer functions as a protective film. Accordingly, in the case that a plurality of SiGe layers are stacked, it is effective to stack a layer having a smaller Ge composition, or a Si layer, on a layer having a larger Ge composition.

FIG. 7 schematically shows a cross-section view of an optical phase modulator 700 according to an embodiment of the present invention. The structure of the optical phase modulator 700 is similar to that of the optical phase modulator 600 shown in FIG. 6, except that a strain inducing film 724 is stacked on a p-type $Si_{1-x2}Ge_{x2}$ layer 722 in the optical phase modulator 700. In the optical phase modulator 700, large strain is generated by stacking the strain inducing film 724 instead of stacking a thick SiGe layer. The strain inducing film 724 may comprise, for example, $SiN_x$ or alumina. Similar to FIG. 6, FIG. 7 shows an Si substrate 702, a BOX layer 704, a PN junction 706, a p-type Si region 730, an n-type Si region 732, a p-type $Si_{1-x1}Ge_{x1}$ layer 708, a first electrode 712, a second electrode 714, a ground electrode 716, a signal electrode 718, and a cladding 720. The PN junction 706 may comprise $Si_{1-y}Ge_y$. A rib-type waveguide structure 710 may comprise a PIN junction in place of the PN junction. The conductivity type of each of the $Si_{1-x1}Ge_{x1}$ layer 708 and the $Si_{1-x2}Ge_{x2}$ layer 722 may be set to be an n type.

Figure 8:
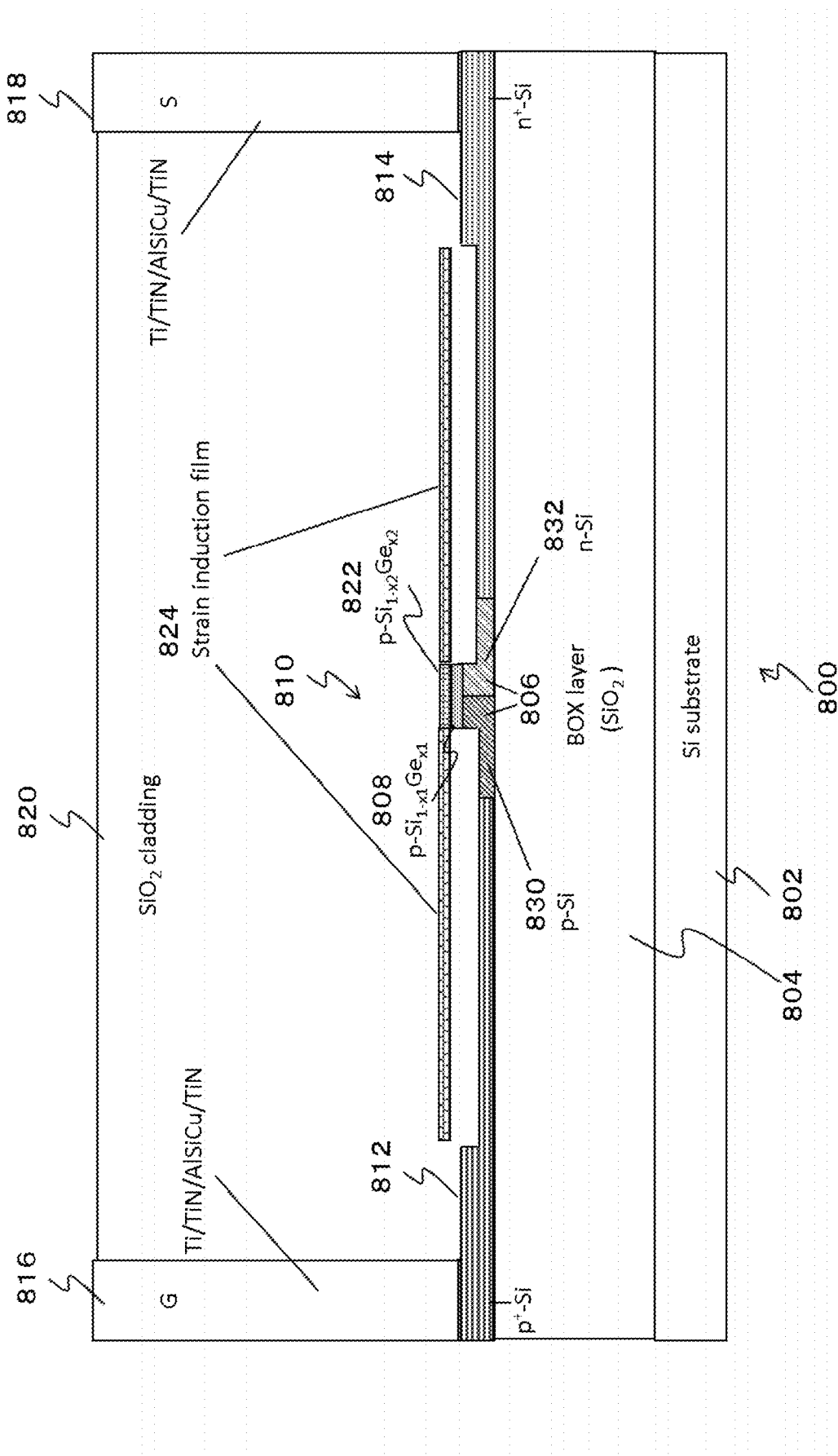
FIG. 8 schematically shows a cross-section view of an optical phase modulator 800 according to an embodiment of the present invention.

FIG. 8 schematically shows a cross-section view of an optical phase modulator 800 according to an embodiment of the present invention. The structure of the optical phase modulator 800 is similar to that of the optical phase modulator 600 shown in FIG. 6, except that strain inducing films 824 are formed in positions adjacent to side surfaces of a p-type $Si_{1-x2}Ge_{x2}$ layer 822 in the optical phase modulator 800. As shown in FIG. 8, the strain inducing films 824 may extend from positions above a PN junction 806 to positions above a first electrode 812 and a second electrode 814. The strain inducing films 824 may be formed in positions adjacent to side surfaces of a p-type $Si_{1-x1}Ge_{x1}$ layer 808. In the optical phase modulator 800 of FIG. 8, large strain is generated by forming the strain inducing films 824 instead of stacking a thick SiGe layer. The strain inducing films 824 may comprise, for example, $SiN_x$ or alumina. Similar to FIG. 6, FIG. 8 shows an Si substrate 802, a BOX layer 804, the PN junction 806, a p-type Si region 830, an n-type Si region 832, the p-type $Si_{1-x1}Ge_{x1}$ layer 808, the first electrode 812, the second electrode 814, a ground electrode 816, a signal electrode 818, and a cladding 820. The PN junction 806 may comprise $Si_{1-y}Ge_y$. A rib-type waveguide structure 810 may comprise a PIN junction in place of the PN junction. The conductivity type of each of the $Si_{1-x1}Ge_{x1}$ layer 808 and the $Si_{1-x2}Ge_{x2}$ layer 222 may be set to be an n type.

Figure 9:
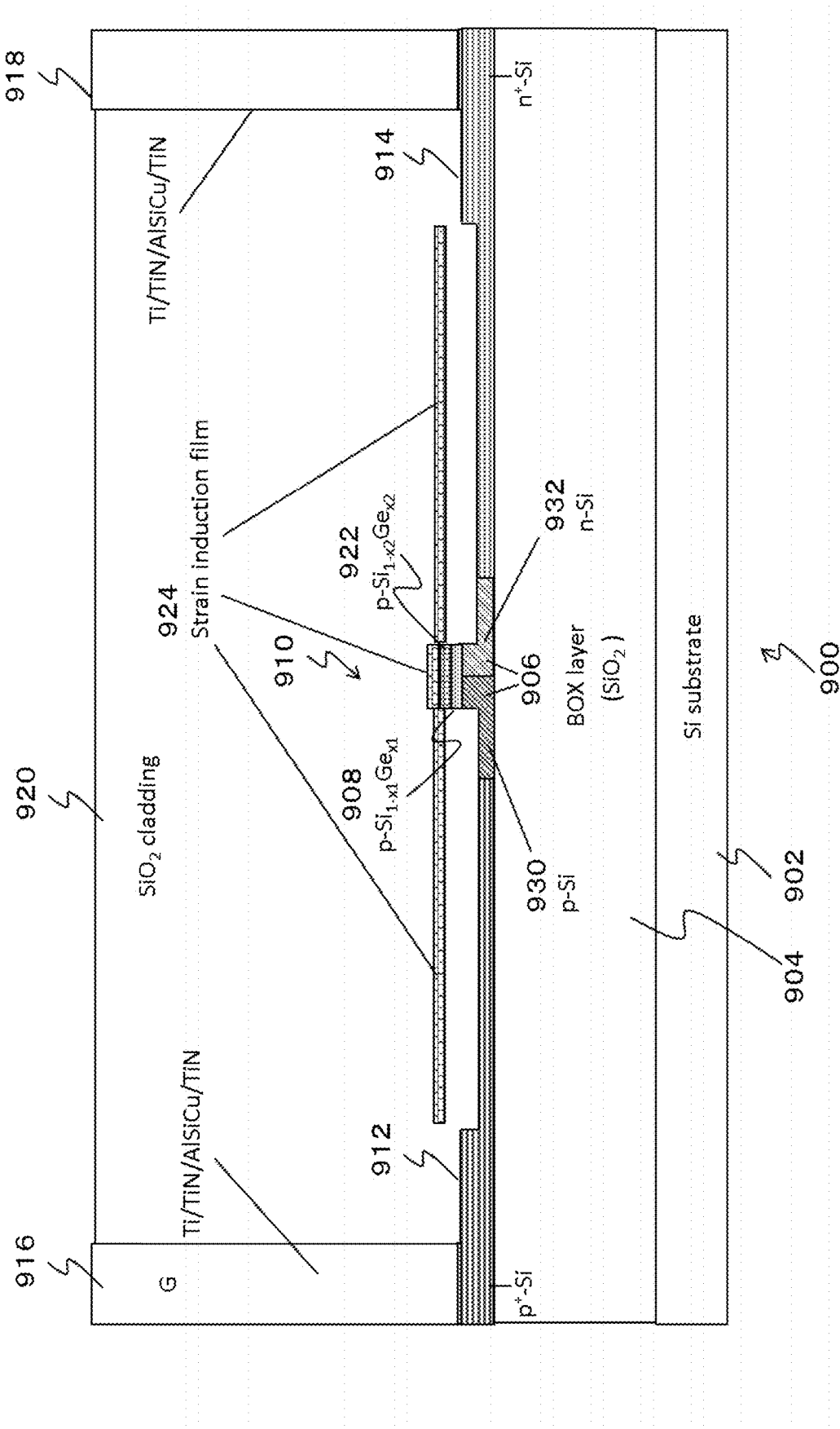
FIG. 9 schematically shows a cross-section view of an optical phase modulator 900 according to an embodiment of the present invention.

FIG. 9 schematically shows a cross-section view of an optical phase modulator 900 according to an embodiment of the present invention. The structure of the optical phase modulator 900 is similar to that of the optical phase modulator 600 shown in FIG. 6, except that strain inducing films 924 are formed in positions which are above a p-type $Si_{1-x2}Ge_{x2}$ layer 922 and adjacent to side surfaces of the p-type $Si_{1-x2}Ge_{x2}$ layer 922 in the optical phase modulator 900. The strain inducing films 924 are stacked on a p-type $Si_{1-x2}Ge_{x2}$ layer 922, in a manner similar to that of the case of the optical phase modulator 700 shown in FIG. 7. Further, the strain inducing films 924 are formed in positions adjacent to side surfaces of a p-type $Si_{1-x2}Ge_{x2}$ layer 922, in a manner similar to that of the case of the optical phase modulator 800 shown in FIG. 8. The strain inducing films 924 may extend from positions above a PN junction 906 to positions above a first electrode 912 and a second electrode 914. The strain inducing films 924 may be formed in positions adjacent to side surfaces of a p-type $Si_{1-x1}Ge_{x1}$ layer 908. In the optical phase modulator 900, large strain is generated by forming the strain inducing films 924 instead of stacking a thick SiGe layer. The strain inducing films 924 may comprise, for example, $SiN_x$ or alumina. Similar to FIG. 6, FIG. 9 shows a Si substrate 902, a BOX layer 904, the PN junction 906, a p-type Si region 930, an n-type Si region 932, the first electrode 912, the second electrode 914, a ground electrode 916, a signal electrode 918, and a cladding 920. The PN junction 906 may comprise $Si_{1-y}Ge_y$. A rib-type waveguide structure 910 may comprise a PIN junction in place of the PN junction. The conductivity type of each of the $Si_{1-x1}Ge_{x1}$ layer 908 and the $Si_{1-x2}Ge_{x2}$ layer 922 may be set to be an n type.

Figure 10:
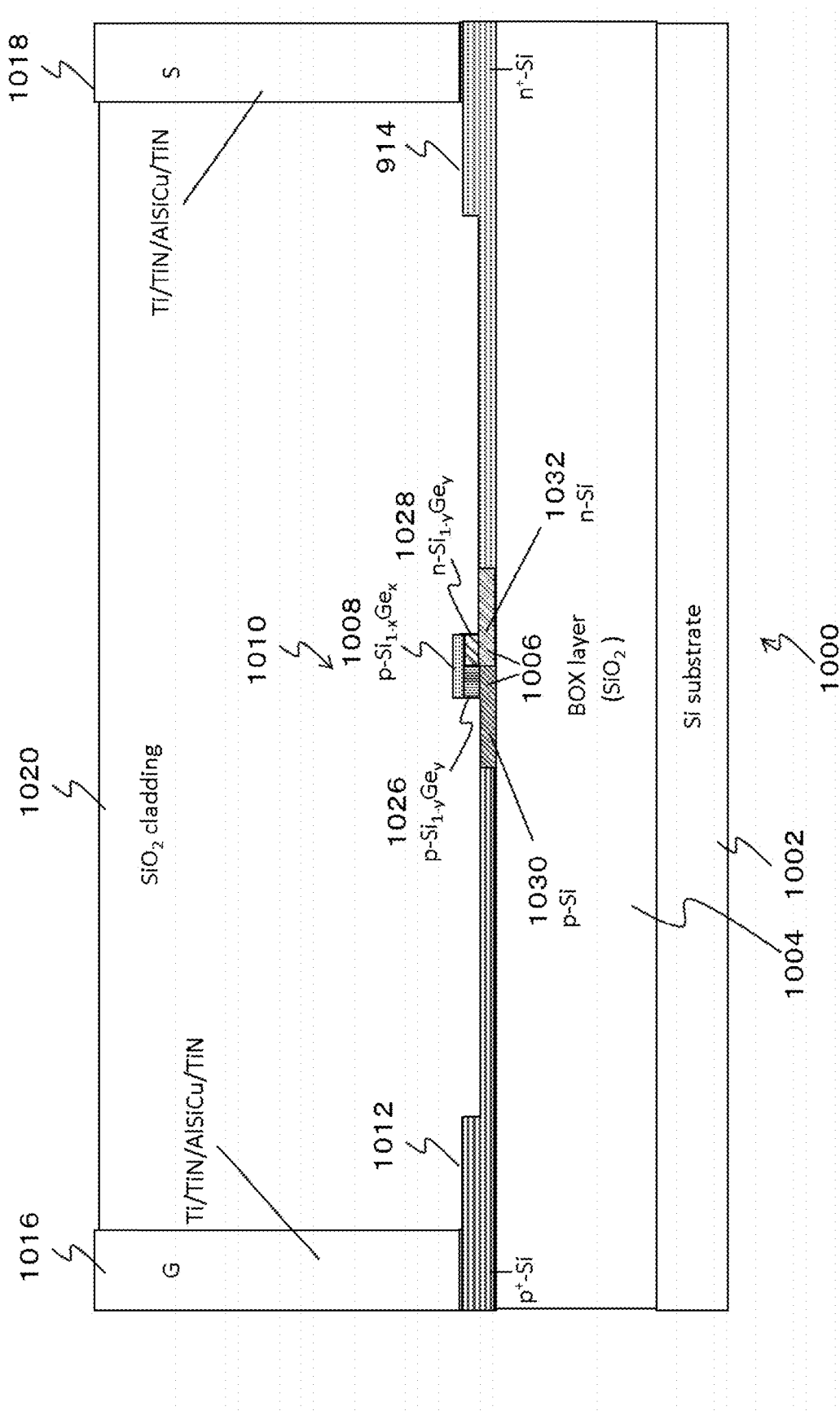
FIG. 10 schematically shows a cross-section view of an optical phase modulator 1000 according to an embodiment of the present invention.

FIG. 10 schematically shows a cross-section view of an optical phase modulator 1000 according to an embodiment of the present invention. The structure of the optical phase modulator 1000 is similar to that of the optical phase modulator 100 shown in FIG. 1, except that a PN junction 1006 comprises a p-type $Si_{1-y}Ge_y$ layer 1026 and an n-type $Si_{1-y}Ge_y$ layer 1028 in the optical phase modulator 1000. In this regard, note that the structures of the layers included in the PN junction 1006 are not limited to the structure described above. In each of the p-type $Si_{1-y}Ge_y$ layer 1026 and the n-type $Si_{1-y}Ge_y$ layer 1028, the value of the ratio of Ge can be set to be any value. Further, a p-type $Si_{1-x1}Ge_{x1}$ layer 1008 may comprise two or more p-type $Si_{1-x}Ge_x$ layers (a p-type $Si_{0.7}Ge_{0.3}$ layer, a p-type $Si_{0.8}Ge_{0.2}$ layer, etc.). Similar to FIG. 1, FIG. 10 shows a Si substrate 1002, a BOX layer 1004, a p-type Si region 1030, an n-type Si region 1032, a first electrode 1012, a second electrode 1014, a ground electrode 1016, a signal electrode 1018, and a cladding 1020. A rib-type waveguide structure 1010 may comprise a PIN junction in place of the PN junction. The conductivity type of the $Si_{1-x}Ge_x$ layer 1008 may be set to be an n type. The Ge composition of each of the p-type $Si_{1-y}Ge_y$ layer 1026 and the n-type $Si_{1-y}Ge_y$ layer 1028 may be smaller than the Ge composition of the p-type $Si_{1-x}Ge_x$ layer 1008. For example, the Ge composition of each of the p-type $Si_{1-y}Ge_y$ layer 1026 and the n-type $Si_{1-y}Ge_y$ layer 1028 may be 10-20%, and the Ge composition of the p-type $Si_{1-x}Ge_x$ layer 1008 may be 30-50%. Similar to the cases of the optical phase modulators shown in FIGS. 7-9, strain inducing films may be formed in positions above the p-type $Si_{1-x}Ge_x$ layer 1008 and/or adjacent to side surfaces of the p-type $Si_{1-x}Ge_x$ layer 1008 in the optical phase modulator 1000 shown in FIG. 10. The PN junction 1006 comprises a layered structure which comprises a PN junction comprising Si and a PN junction comprising $Si_{1-y}Ge_y$. In this embodiment, since the PN junction 1006 comprises a SiGe layer, the refractive index of the PN junction 1006 becomes higher, compared with that of the optical phase modulator 100 shown in FIG. 1. Thus, according to this embodiment, the effect to confine light is further enhanced, and optical modulation efficiency is improved.

Figure 11:
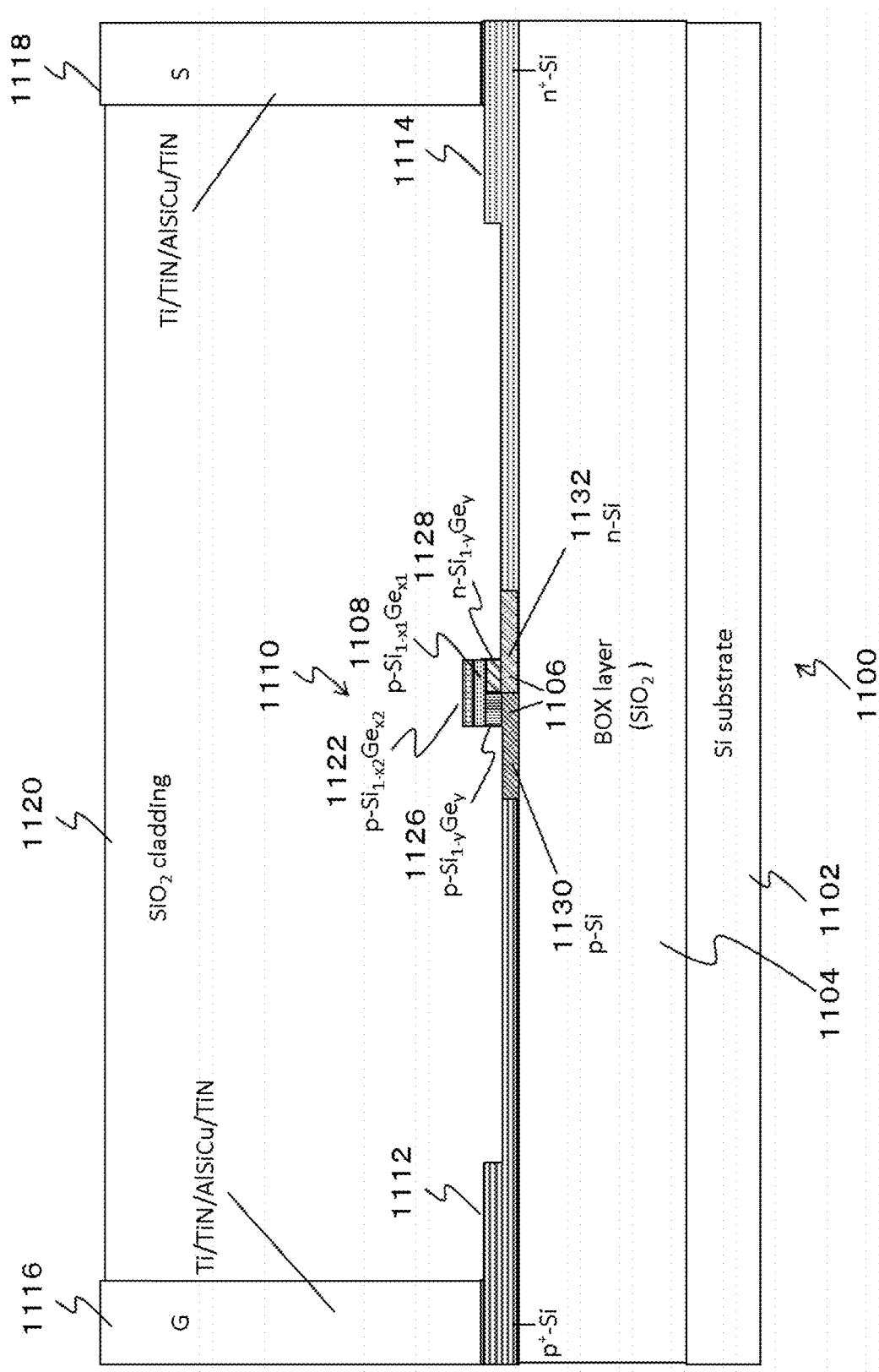
FIG. 11 schematically shows a cross-section view of an optical phase modulator 1100 according to an embodiment of the present invention.

FIG. 11 schematically shows a cross-section view of an optical phase modulator 1100 according to an embodiment of the present invention. The structure of the optical phase modulator 1100 is similar to that of the optical phase modulator 1000 shown in FIG. 10, except that a p-type $Si_{1-x2}Ge_{x2}$ layer 1122 is stacked on a p-type $Si_{1-x1}Ge_{x1}$ layer 1108 in the optical phase modulator 1100. In this regard, note that the constructions of the layers included in the PN junction 1106 are not limited to the structures shown in FIG. 11. In each of the p-type $Si_{1-y}Ge_y$ layer 1126 and the n-type $Si_{1-y}Ge_y$ layer 1128, the value of the ratio of Ge can be set to be any value. Similar to FIG. 10, FIG. 11 shows a Si substrate 1102, a BOX layer 1104, a p-type Si region 1130, an n-type Si region 1132, a first electrode 1112, a second electrode 1114, a ground electrode 1116, a signal electrode 1118, and a cladding 1120. A rib-type waveguide structure 1110 may comprise a PIN junction in place of the PN junction. The conductivity type of each of the $Si_{1-x1}Ge_{x1}$ layer 1108 and the $Si_{1-x2}Ge_{x2}$ layer 1122 may be set to be an n type. Similar to the cases of the optical phase modulators shown in FIGS. 7-9, strain inducing films may be formed in positions above the p-type $Si_{1-x2}Ge_{x2}$ layer 1122 and/or adjacent to side surfaces of the p-type $Si_{1-x2}Ge_{x2}$ layer 1122, and/or above the p-type $Si_{1-x1}Ge_{x1}$ layer 1108 and/or adjacent to side surfaces of the p-type $Si_{1-x1}Ge_{x1}$ layer 1108 in the optical phase modulator 1100 shown in FIG. 11. In this embodiment, since the PN junction 1106 comprises a SiGe layer, the refractive index of the PN junction 1106 becomes higher, compared with that of a PN junction comprising Si only. Thus, according to this embodiment, the effect to confine light is further enhanced, and optical modulation efficiency is improved.

Figure 12:
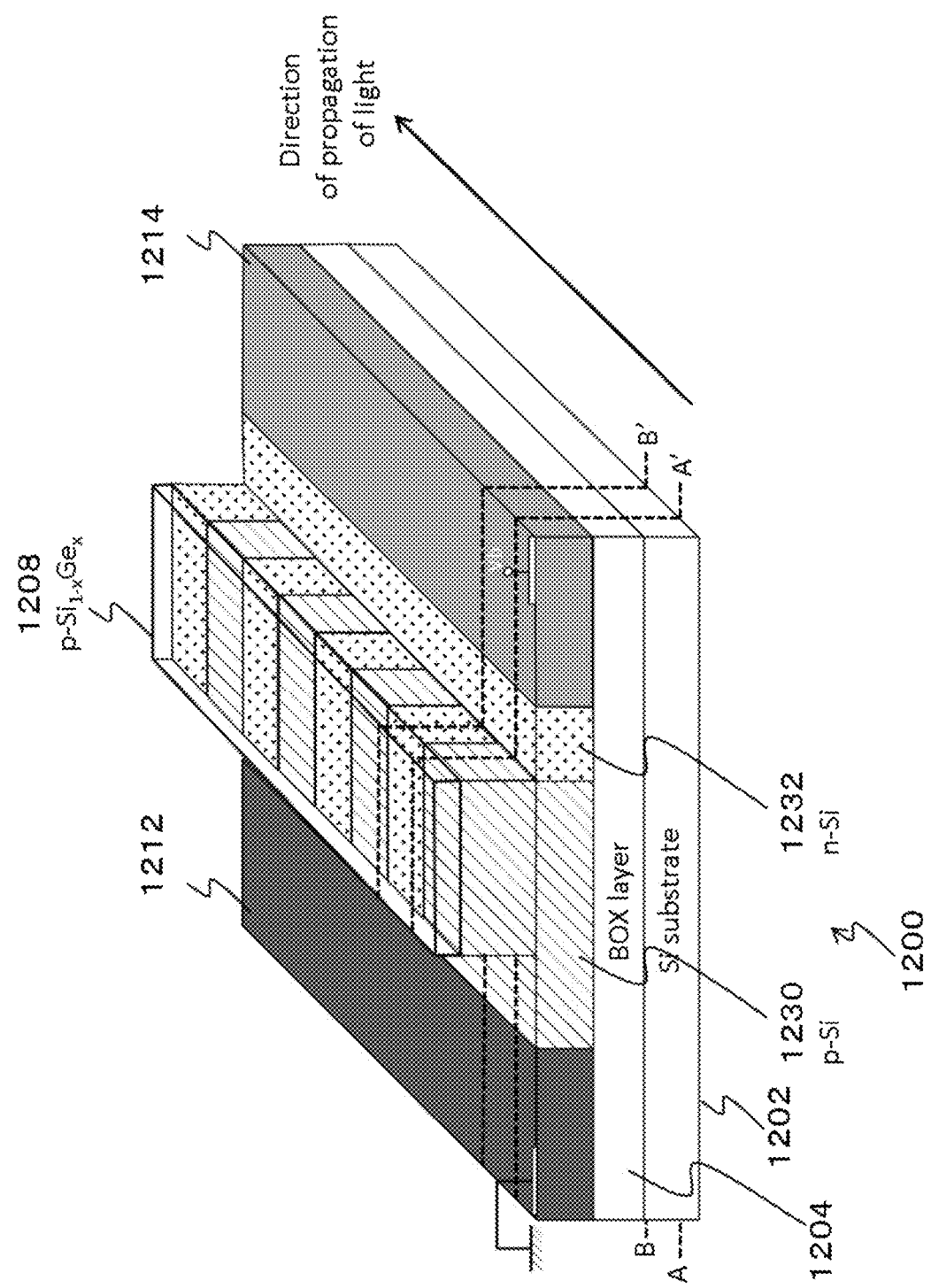
FIG. 12 schematically shows a perspective view of an optical phase modulator 1200 according to an embodiment of the present invention.

FIG. 12 schematically shows a perspective view of an optical phase modulator 1200 according to an embodiment of the present invention. The optical phase modulator 1200 comprises a Si substrate 1202, a BOX layer 1204, a p-type Si region 1230, an n-type Si region 1232, a p-type $Si_{1-x}Ge_x$ layer 1208, a first electrode 1212, and a second electrode 1214. The p-type $Si_{1-x}Ge_x$ layer 1208 is stacked on the p-type Si region 1230 and the n-type Si region 1232. The optical phase modulator 1200 is constructed in such a manner that, in the waveguide part, parts of the p-type Si region 1230 and parts of the n-type Si region 1232 are arranged in an alternating manner along the direction of propagation of light. Thus, a plurality of PN junctions comprising Si are formed along the direction of propagation of light. In FIG. 12, parts of the p-type Si region 1230 and parts of the n-type Si region 1232 arranged in an alternating manner are drawn in such a manner that the widths thereof (the widths along the direction of propagation of light) are approximately equal to each other; thus, it is understood that a plurality of PN junctions are formed in a periodic manner along the direction of propagation of light. In another embodiment, the PN junction may be replaced by a PIN junction. Further, the widths of parts of the p-type Si region 1230 and parts of the n-type Si region 1232 arranged in an alternating manner may be different from each other. Thus, a plurality of PN junctions or PIN junctions may be formed in an aperiodic manner along the direction of propagation of light.

Figure 13:
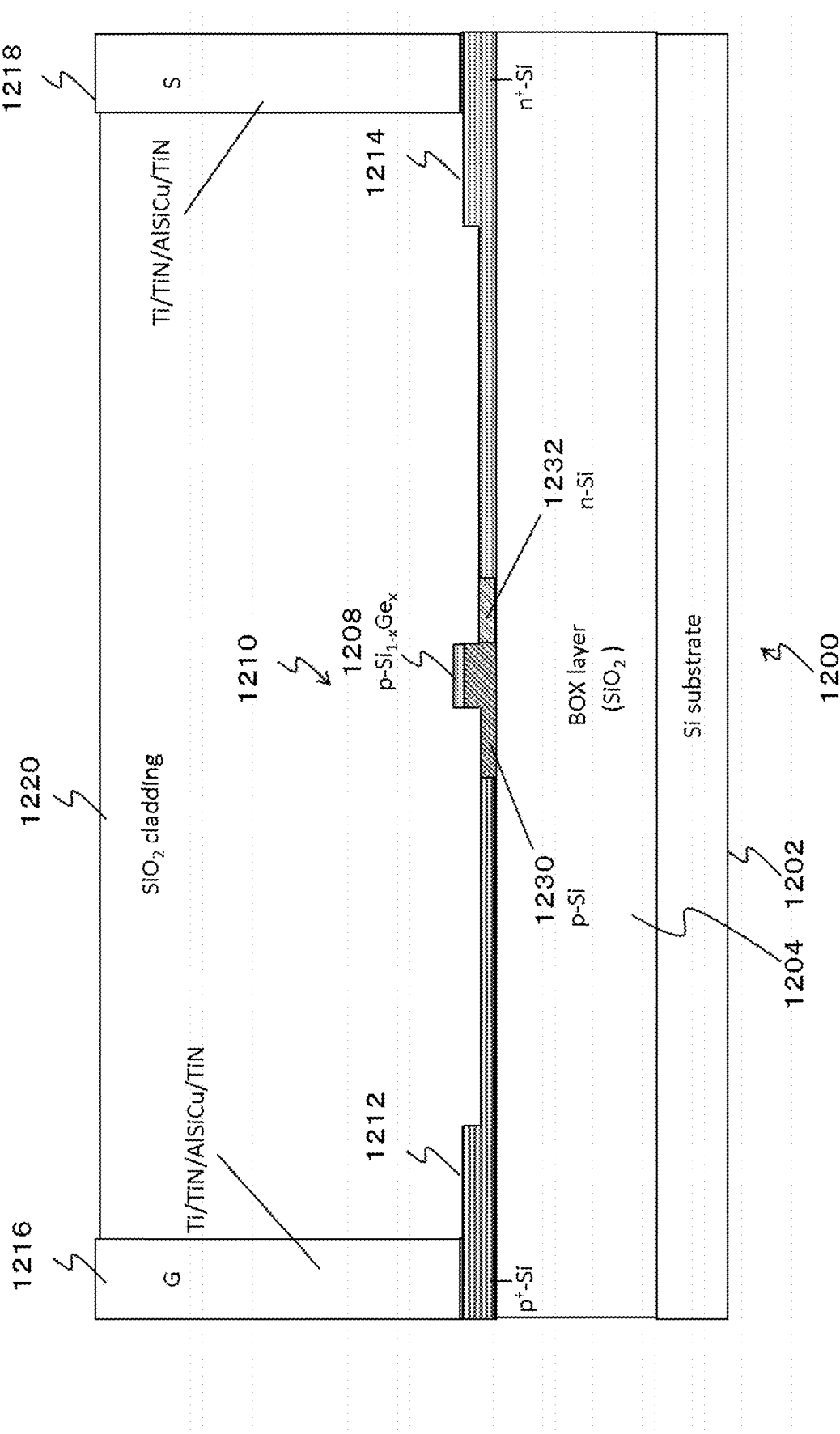
FIG. 13 schematically shows a cross-section view of the optical phase modulator shown in FIG. 12.
Figure 14:
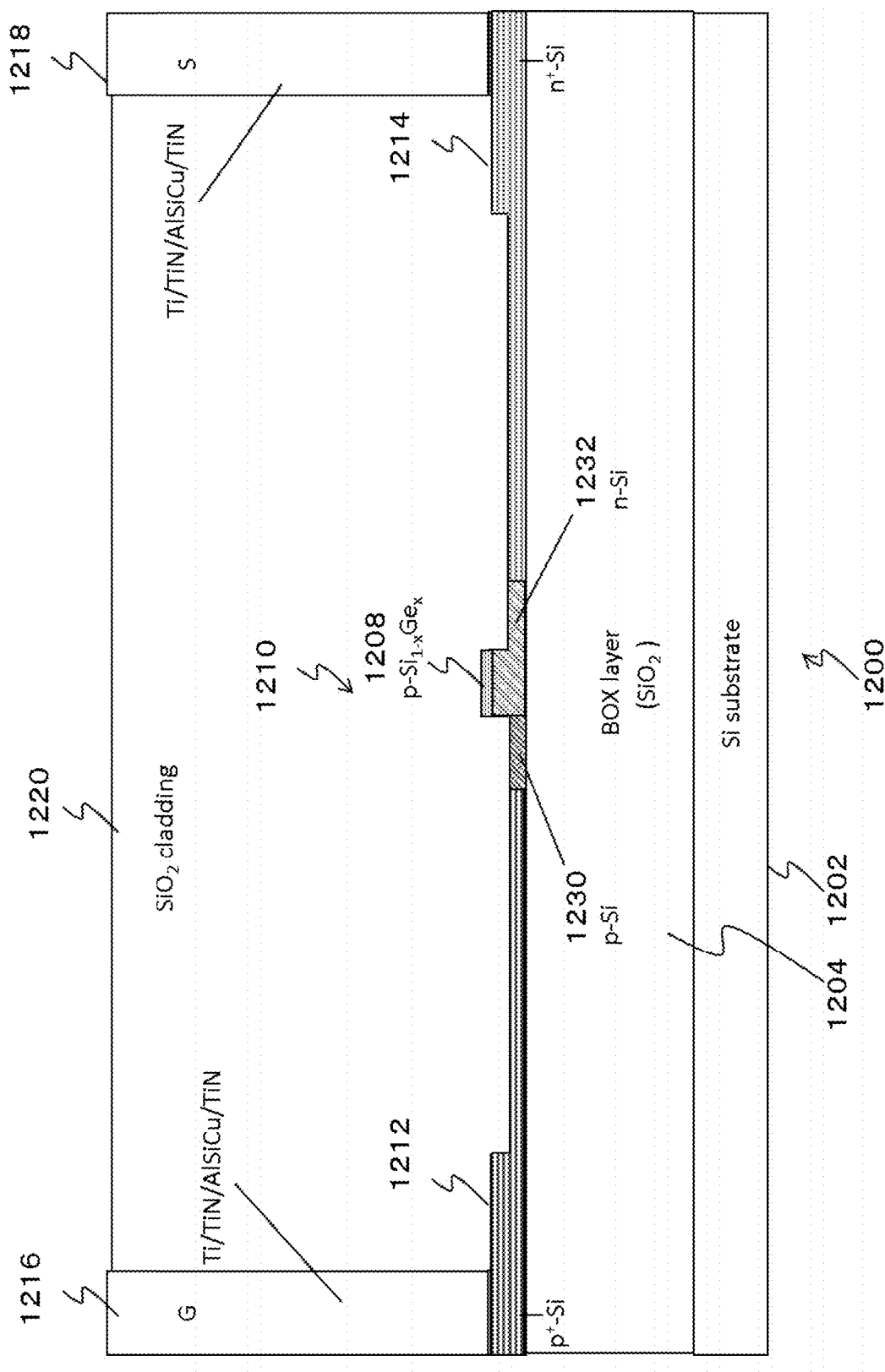
FIG. 14 schematically shows a cross-section view of the optical phase modulator shown in FIG. 12.

Each of FIGS. 13 and 14 schematically shows a cross-section view of the optical phase modulator 1200 shown in FIG. 12. FIG. 13 corresponds to a cross-section view at line A-A' in FIG. 12, and FIG. 14 corresponds to a cross-section view at line B-B' in FIG. 12. In relation to the structure shown in FIG. 12, it is shown in FIG. 13 that the p-type Si region 1230 extends up to the right edge of the p-type $Si_{1-x}Ge_x$ layer 1208. On the other hand, it is shown in FIG. 14 that the n-type Si region 1232 extends up to the left edge of the p-type $Si_{1-x}Ge_x$ layer 1208. Similar to the above embodiments, each of FIGS. 13 and 14 shows the Si substrate 1202, the BOX layer 1204, the p-type $Si_{1-x}Ge_x$ layer 1208, a rib-type waveguide structure 1210, the first electrode 1212, the second electrode 1214, a ground electrode 1216, a signal electrode 1218, and a cladding 1220. The conductivity type of the $Si_{1-x}Ge_x$ layer 1208 may be set to be an n type.

According to the embodiment shown in FIGS. 12-14, it becomes possible to improve overlap between an optical field and a carrier-density-modulated region.

Figure 15:
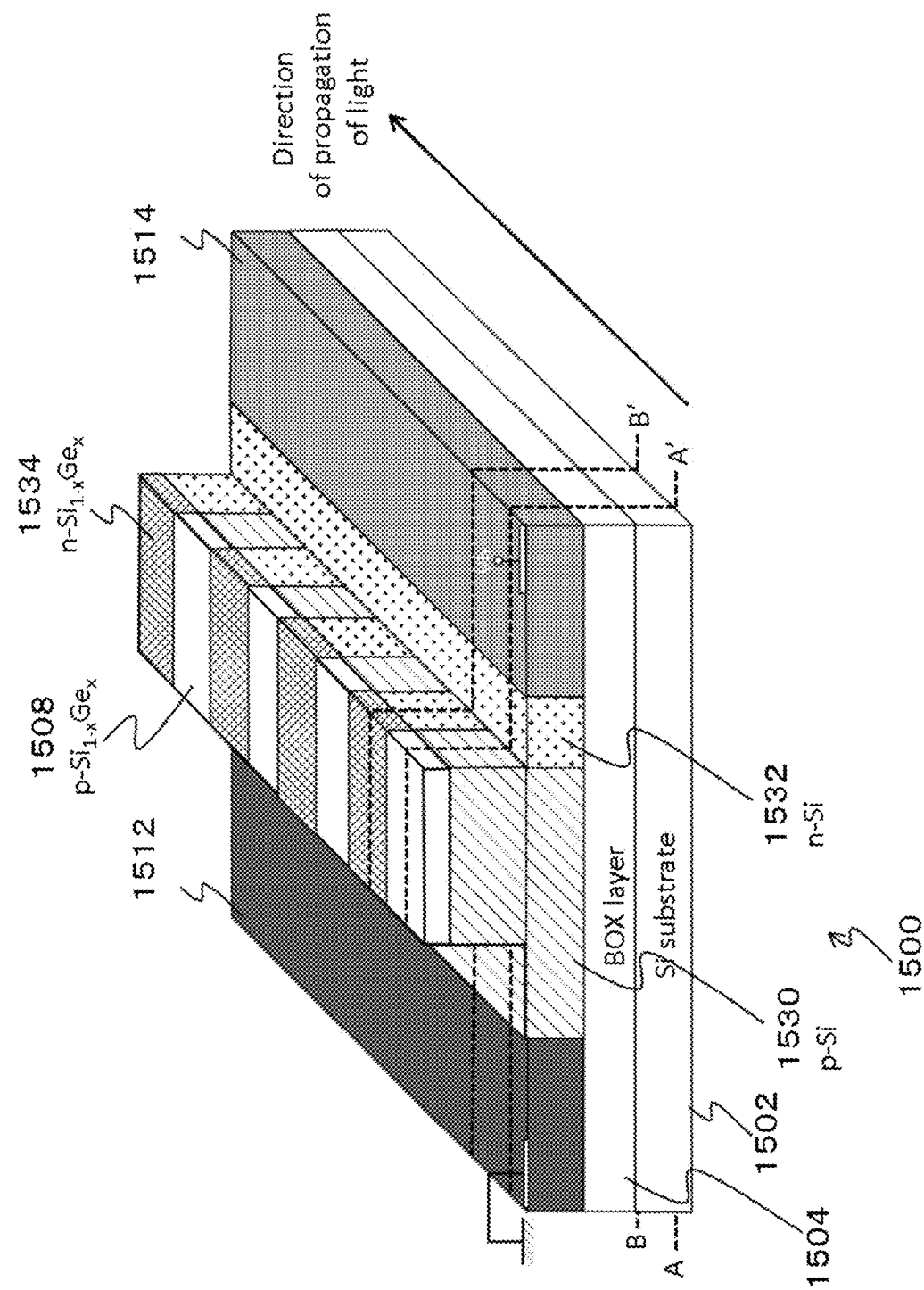
FIG. 15 schematically shows a perspective view of an optical phase modulator 1500 according to an embodiment of the present invention.

FIG. 15 schematically shows a perspective view of an optical phase modulator 1500 according to an embodiment of the present invention. Similar to the optical phase modulator 1200 shown in FIG. 12, the optical phase modulator 1500 comprises an Si substrate 1502, a BOX layer 1504, a p-type Si region 1530, an n-type Si region 1532, a first electrode 1512, and a second electrode 1514. The optical phase modulator 1500 is constructed in such a manner that, in the waveguide part, parts of the p-type Si region 1530 and parts of the n-type Si region 1532 are arranged in an alternating manner along the direction of propagation of light. Thus, a plurality of PN junctions are formed in a periodic manner along the direction of propagation of light. SiGe layers are stacked on the plurality of PN junctions. In this regard, unlike the optical phase modulator 1200, corresponding to junction positions of the plurality of PN junctions, the conductivity type of at least one $Si_{1-x}Ge_x$ layer stacked on the PN junctions in the optical phase modulator 1500 changes, in an alternating manner, between a first conductivity type (for example, a p type) and a second conductivity type (for example, an n type). That is, in the optical waveguide part, a p-type $Si_{1-x}Ge_x$ layer 1508 is formed on a part of the p-type Si region 1530, and an n-type $Si_{1-x}Ge_x$ layer 1534 is formed on a part of the n-type Si region 1532. In another embodiment, the PN junction may be replaced by a PIN junction. Further, the widths of parts of the p-type Si region 1530 and parts of the n-type Si region 1532 arranged in an alternating manner may be different from each other. Thus, a plurality of PN junctions or PIN junctions may be formed in an aperiodic manner along the direction of propagation of light. Corresponding to junction positions of the plurality of PN junctions or the plurality of PIN junctions, which are formed in a periodic manner or an aperiodic manner, the conductivity type of at least one $Si_{1-x}Ge_x$ layer stacked on a plurality of PN junctions or a plurality of PIN junctions may change between a first conductivity type and a second conductivity type, in an alternating manner.

Figure 16:
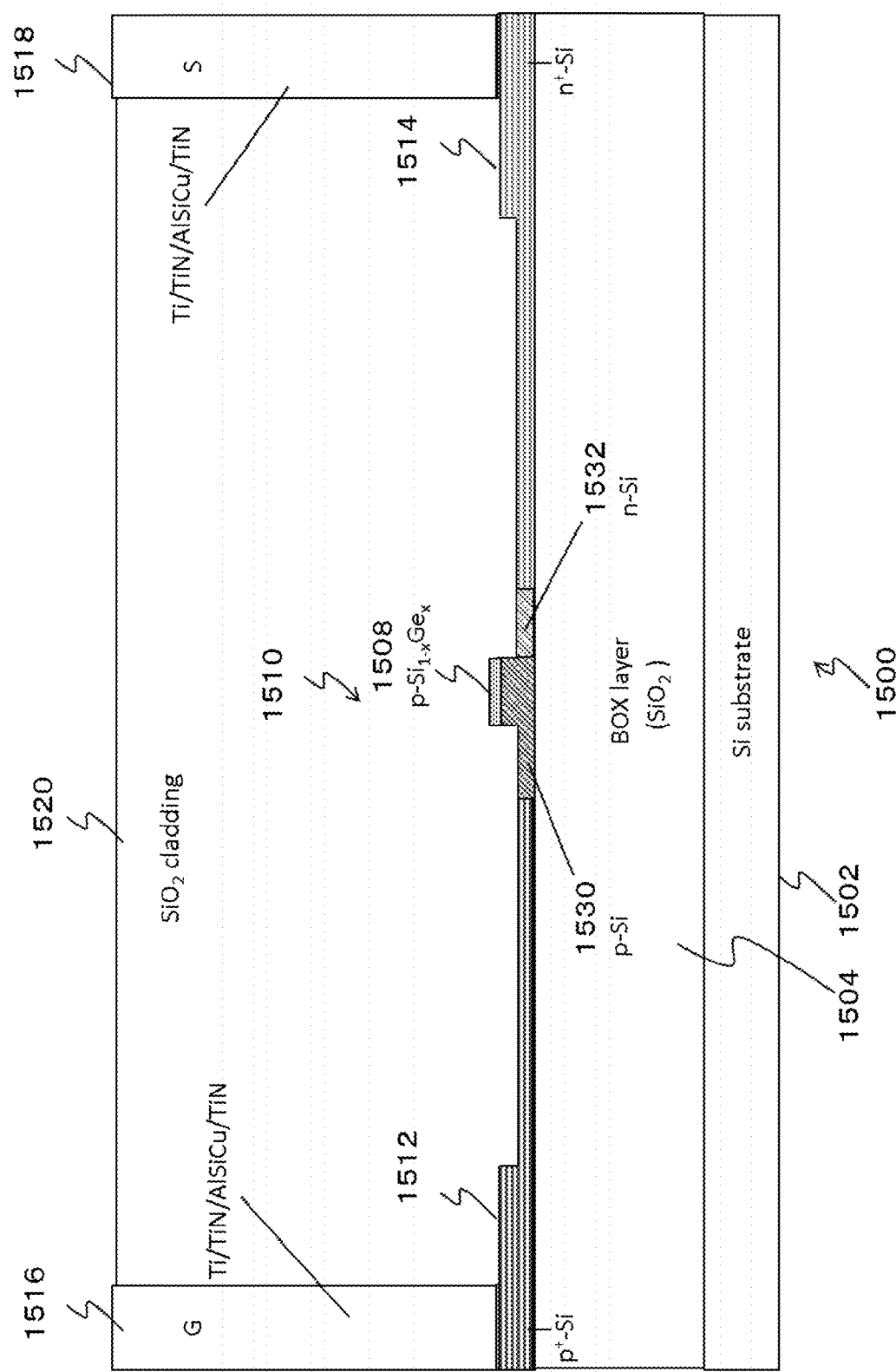
FIG. 16 schematically shows a cross-section view of the optical phase modulator shown in FIG. 15.
Figure 17:
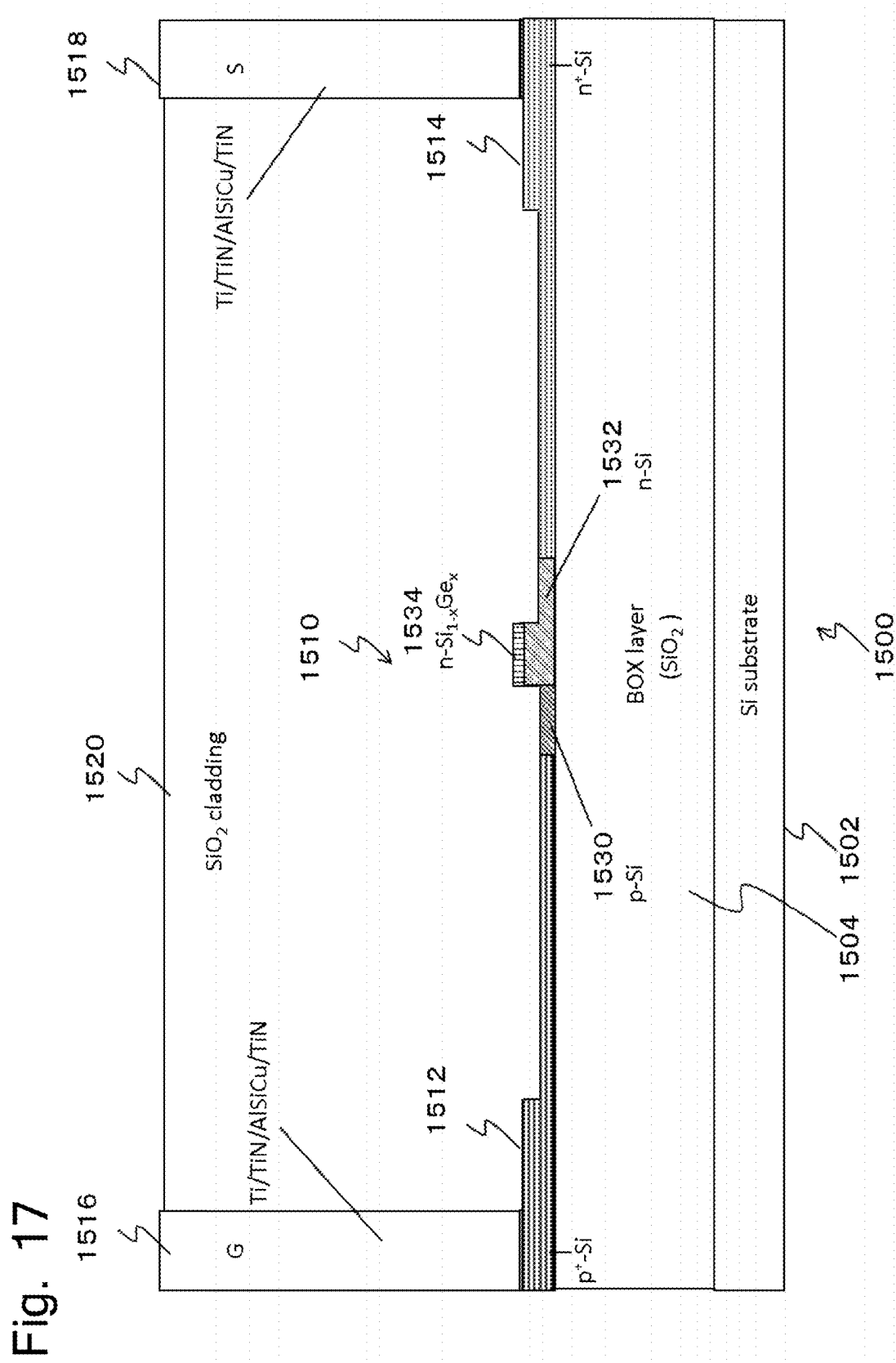
FIG. 17 schematically shows a cross-section view of the optical phase modulator shown in FIG. 15.

Each of FIGS. 16 and 17 schematically shows a cross-section view of the optical phase modulator 1500 shown in FIG. 15. FIG. 16 corresponds to a cross-section view at line A-A' in FIG. 15, and FIG. 17 corresponds to a cross-section view at line B-B' in FIG. 15. In relation to the structure shown in FIG. 15, the p-type $Si_{1-x}Ge_x$ layer 1508 is formed in FIG. 16. The p-type Si region 1530 extends up to the right edge of the p-type $Si_{1-x}Ge_x$ layer 1508. On the other hand, the n-type $Si_{1-x}Ge_x$ layer 1534 is formed in FIG. 17. The n-type Si region 1532 extends up to the left edge of the n-type $Si_{1-x}Ge_x$ layer 1534. Further, each of FIGS. 16 and 17 shows the Si substrate 1502, the BOX layer 1504, a rib-type waveguide structure 1510, the first electrode 1512, the second electrode 1514, a ground electrode 1516, a signal electrode 1518, and a cladding 1520.

According to the embodiment shown in FIGS. 15-17, it becomes possible to enhance overlap between an optical field and a carrier-density-modulated region.

Figure 18:
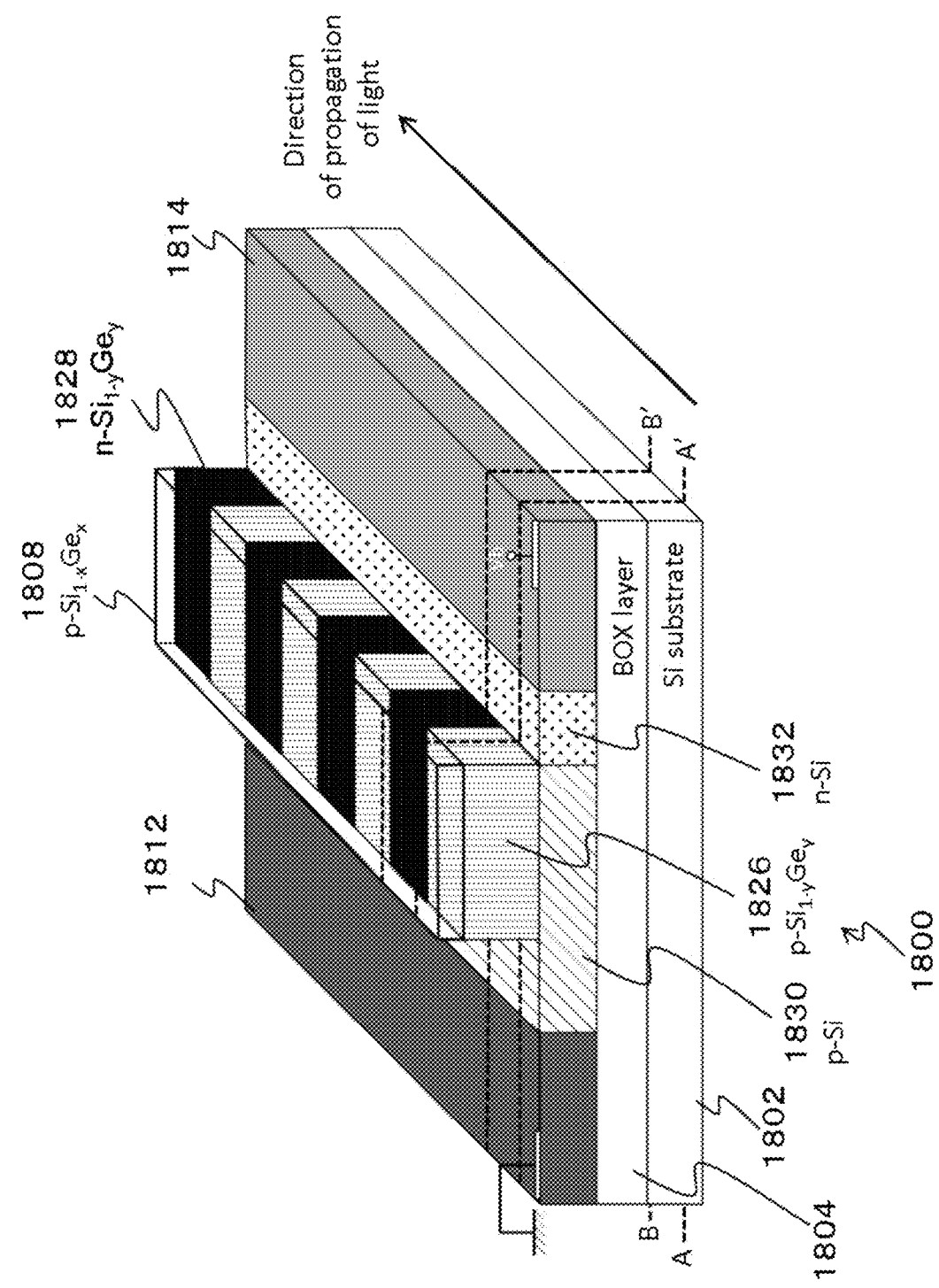
FIG. 18 schematically shows a perspective view of an optical phase modulator 1800 according to an embodiment of the present invention.

FIG. 18 schematically shows a perspective view of an optical phase modulator 1800 according to an embodiment of the present invention. The optical phase modulator 1800 comprises a Si substrate 1802, a BOX layer 1804, a p-type Si region 1830, an n-type Si region 1832, p-type $Si_{1-y}Ge_y$ layers 1826, n-type $Si_{1-y}Ge_y$ layers 1828, a p-type $Si_{1-x}Ge_x$ layer 1808, a first electrode 1812, and a second electrode 1814. The p-type $Si_{1-x}Ge_x$ layer 1808 is stacked on the p-type $Si_{1-y}Ge_y$ layers 1826 and the n-type $Si_{1-y}Ge_y$ layers 1828. The optical phase modulator 1800 is constructed in such a manner that, in the waveguide part, "parts of the p-type Si region 1830 and the p-type $Si_{1-y}Ge_y$ layers 1826" and "parts of the n-type Si region 1832 and the n-type $Si_{1-y}Ge_y$ layers 1828" are arranged in an alternating manner along the direction of propagation of light. Thus, a plurality of PN junctions comprising Si and SiGe are formed along the direction of propagation of light. In FIG. 18, the widths of "the parts of the p-type Si region 1830 and the p-type $Si_{1-y}Ge_y$ layers 1826" and "the parts of the n-type Si region 1832 and the n-type $Si_{1-y}Ge_y$ layers 1828" arranged in an alternative manner are approximately equal to each other, and, thus, a plurality of PN junctions are formed in a periodic manner along the direction of propagation of light. In another embodiment, the PN junction may be replaced by a PIN junction. Further, the widths of "the parts of the p-type Si region 1830 and the p-type $Si_{1-y}Ge_y$ layers 1826" and "the parts of the n-type Si region 1832 and the n-type $Si_{1-y}Ge_y$ layers 1828" arranged in an alternating manner may be different from each other. Thus, a plurality of PN junctions or PIN junctions may be formed in an aperiodic manner along the direction of propagation of light.

Figure 19:
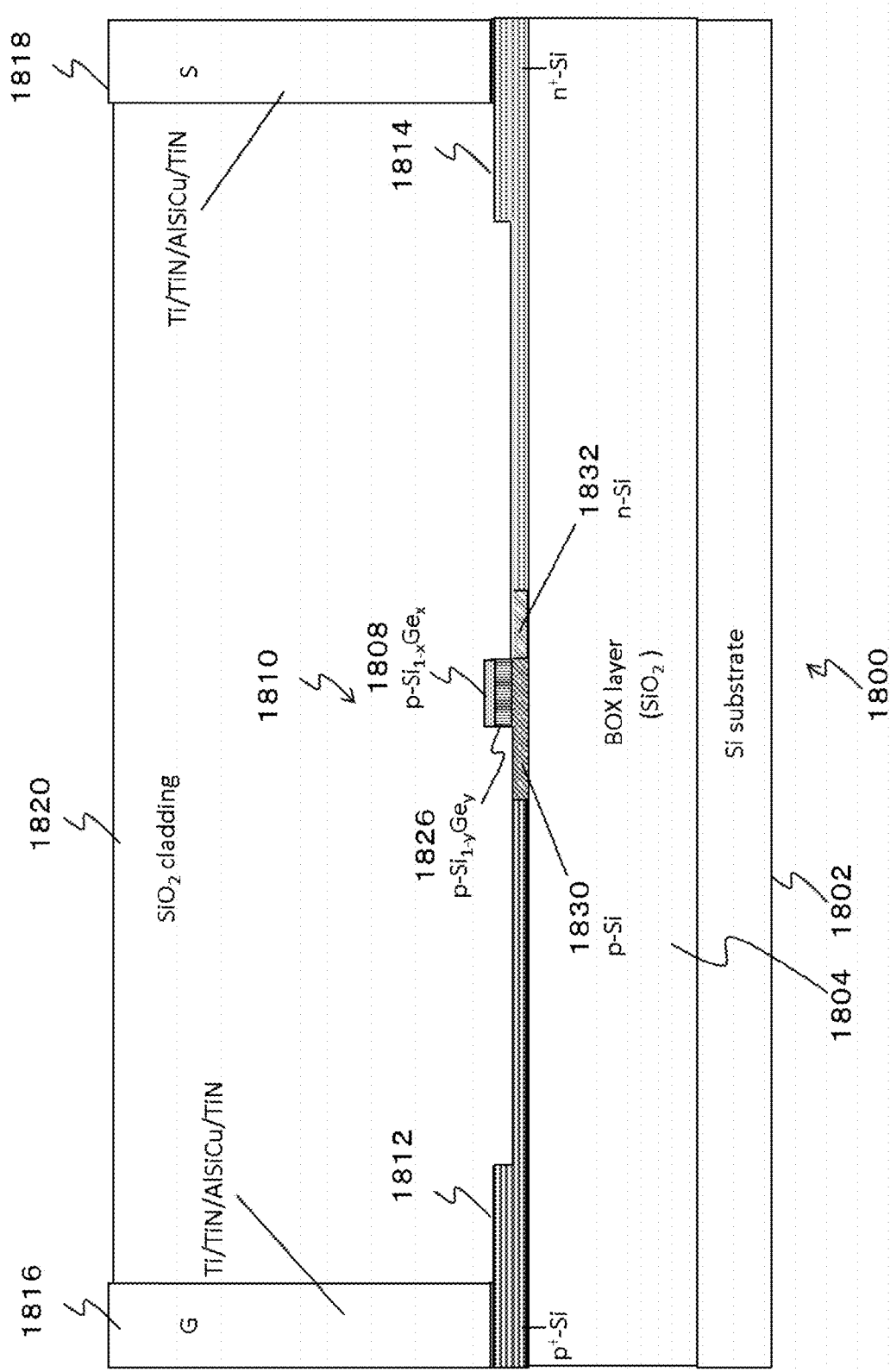
FIG. 19 schematically shows a cross-section view of the optical phase modulator shown in FIG. 18.
Figure 20:
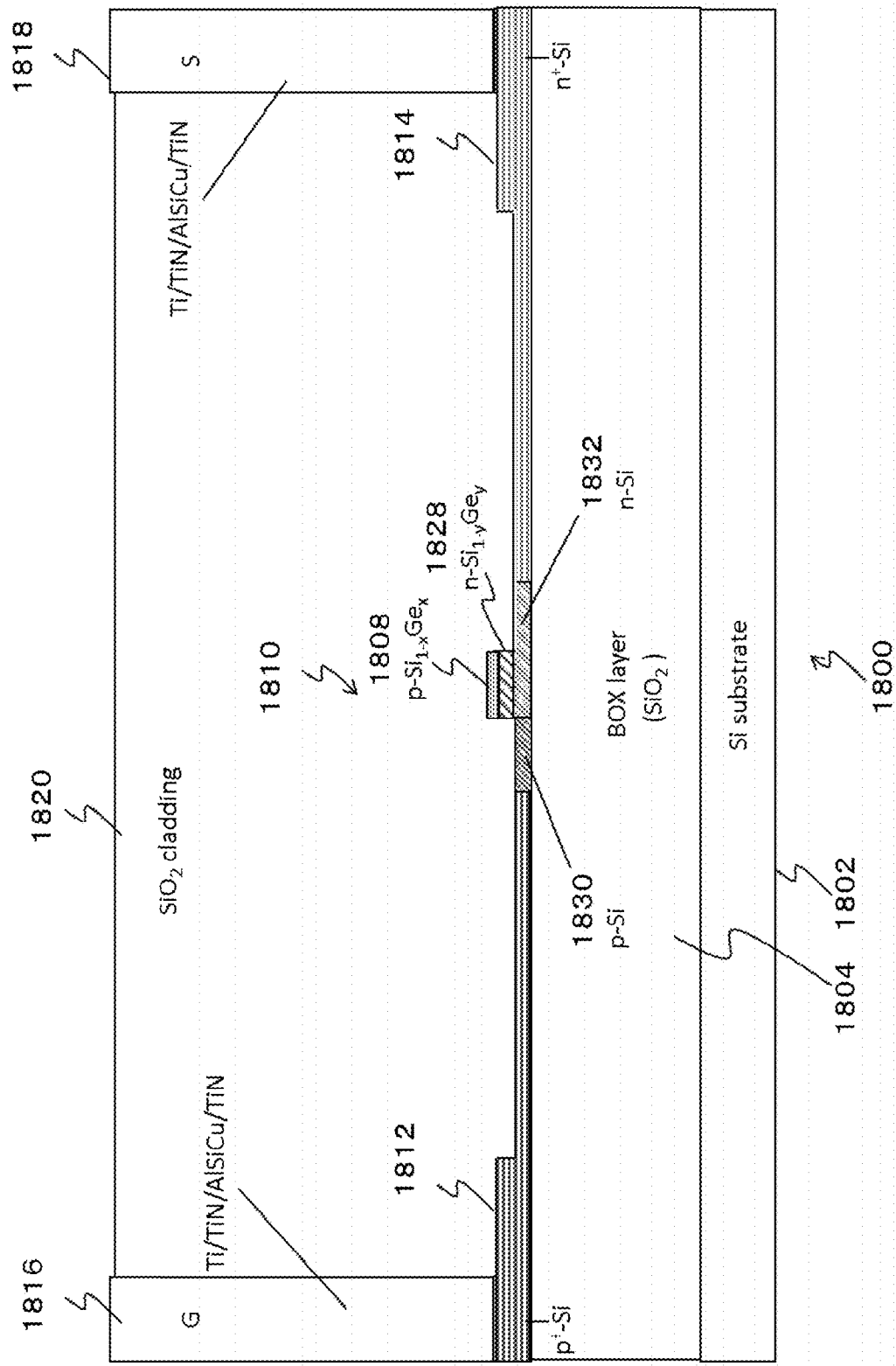
FIG. 20 schematically shows a cross-section view of the optical phase modulator shown in FIG. 18.

Each of FIGS. 19 and 20 schematically shows a cross-section view of the optical phase modulator 1800 shown in FIG. 18. FIG. 19 corresponds to a cross-section view at line A-A' in FIG. 18, and FIG. 20 corresponds to a cross-section view at line B-B' in FIG. 18. In relation to the structure shown in FIG. 18, it is shown in FIG. 19 that the p-type Si region 1830 extends up to the right edge of the p-type $Si_{1-x}Ge_x$ layer 1808, and the p-type $Si_{1-y}Ge_y$ layer 1826 is stacked on the p-type Si region 1830. On the other hand, it is shown in FIG. 20 that the n-type Si region 1832 extends up to the left edge of the p-type $Si_{1-x}Ge_x$ layer 1808, and the n-type $Si_{1-y}Ge_y$ layer 1828 is stacked on the n-type Si region 1832. Further, each of FIGS. 19 and 20 shows the Si substrate 1802, the BOX layer 1804, a rib-type waveguide structure 1810, the first electrode 1812, the second electrode 1814, a ground electrode 1816, a signal electrode 1818, and a cladding 1820. The conductivity type of the $Si_{1-x}Ge_x$ layer 1808 may be set to be an n type.

According to the embodiment shown in FIGS. 18-20, it becomes possible to improve overlap between an optical field and a carrier-density-modulated region.

Figure 21:
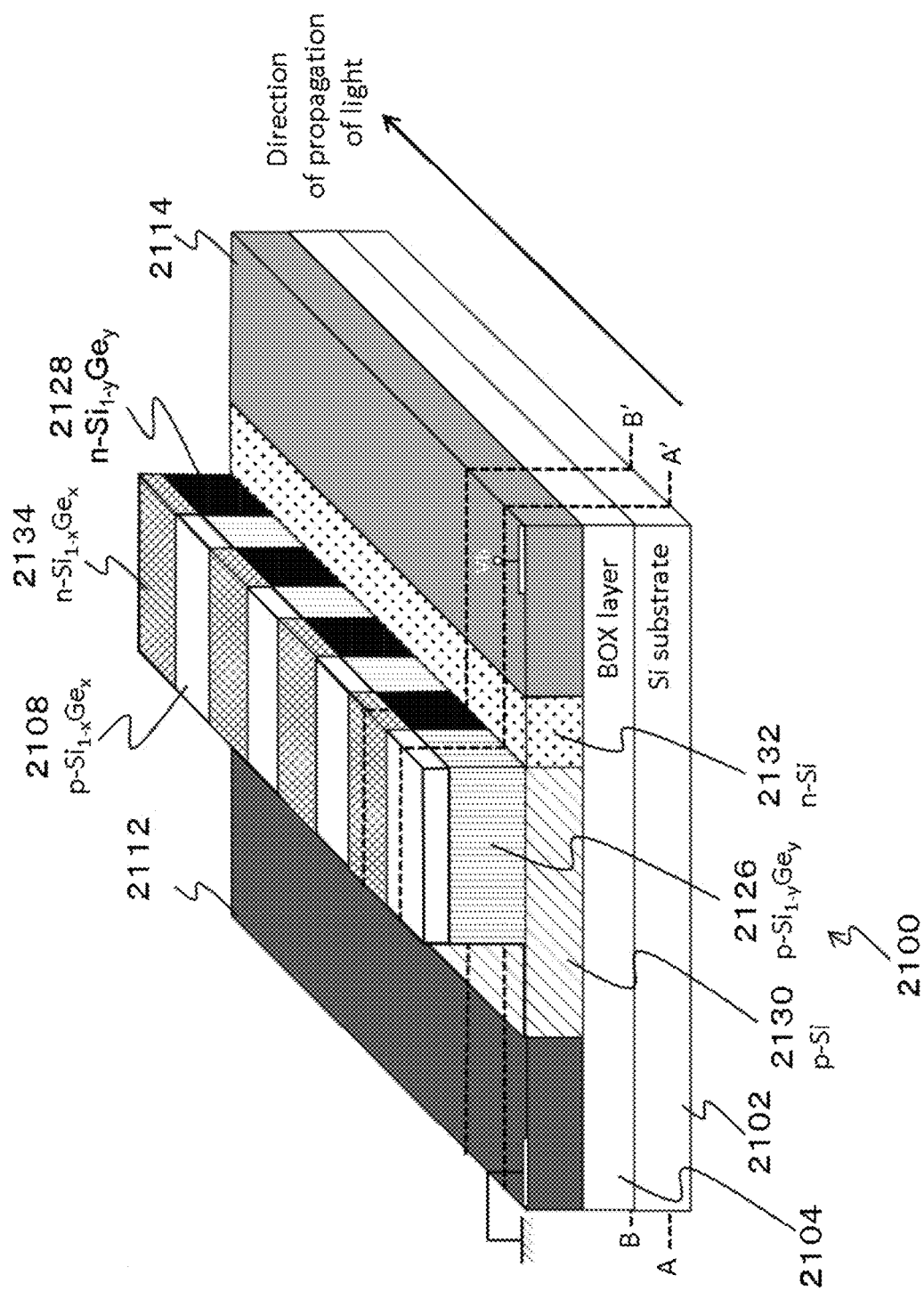
FIG. 21 schematically shows a perspective view of an optical phase modulator 2100 according to an embodiment of the present invention.

FIG. 21 schematically shows a perspective view of an optical phase modulator 2100 according to an embodiment of the present invention. Similar to the optical phase modulator 1800 shown in FIG. 18, the optical phase modulator 2100 comprises an Si substrate 2102, a BOX layer 2104, a p-type Si region 2130, an n-type Si region 2132, p-type $Si_{1-y}Ge_y$ layers 2126, n-type $Si_{1-y}Ge_y$ layers 2128, a first electrode 2112, and a second electrode 2114. The optical phase modulator 2100 is constructed in such a manner that, in the waveguide part, "parts of the p-type Si region 2130 and the p-type $Si_{1-y}Ge_y$ layers 2126" and "parts of the n-type Si region 2132 and the n-type $Si_{1-y}Ge_y$ layers 2128" are arranged in an alternating manner along the direction of propagation of light. Thus, a plurality of PN junctions comprising Si and SiGe are formed along the direction of propagation of light. SiGe layers are stacked on the plurality of PN junctions. In this regard, unlike the optical phase modulator 1800, corresponding to junction positions of the plurality of PN junctions, the conductivity type of at least one $Si_{1-x}Ge_x$ layer stacked on the PN junctions in the optical phase modulator 2100 changes, in an alternating manner, between a first conductivity type (for example, a p type) and a second conductivity type (for example, an n type). That is, in the optical waveguide part, a p-type $Si_{1-x}Ge_x$ layer 2108 is formed on the p-type $Si_{1-y}Ge_y$ layer 2126, and an n-type $Si_{1-x}Ge_x$ layer 2134 is formed on the n-type $Si_{1-y}Ge_y$ layer 2128. In another embodiment, the PN junction may be replaced by a PIN junction. Further, the widths of "the parts of the p-type Si region 2130 and the p-type $Si_{1-y}Ge_y$ layers 2126" and "the parts of the n-type Si region 2132 and the n-type $Si_{1-y}Ge_y$ layers 2128" arranged in an alternating manner may be different from each other. Thus, a plurality of PN junctions or PIN junctions may be formed in an aperiodic manner along the direction of propagation of light. Corresponding to junction positions of the plurality of PN junctions or the plurality of PIN junctions, which are formed in a periodic manner or an aperiodic manner, the conductivity type of at least one $Si_{1-x}Ge_x$ layer stacked on plurality of PN junctions or plurality of PIN junctions may change between a first conductivity type and a second conductivity type, in an alternating manner.

Figure 22:
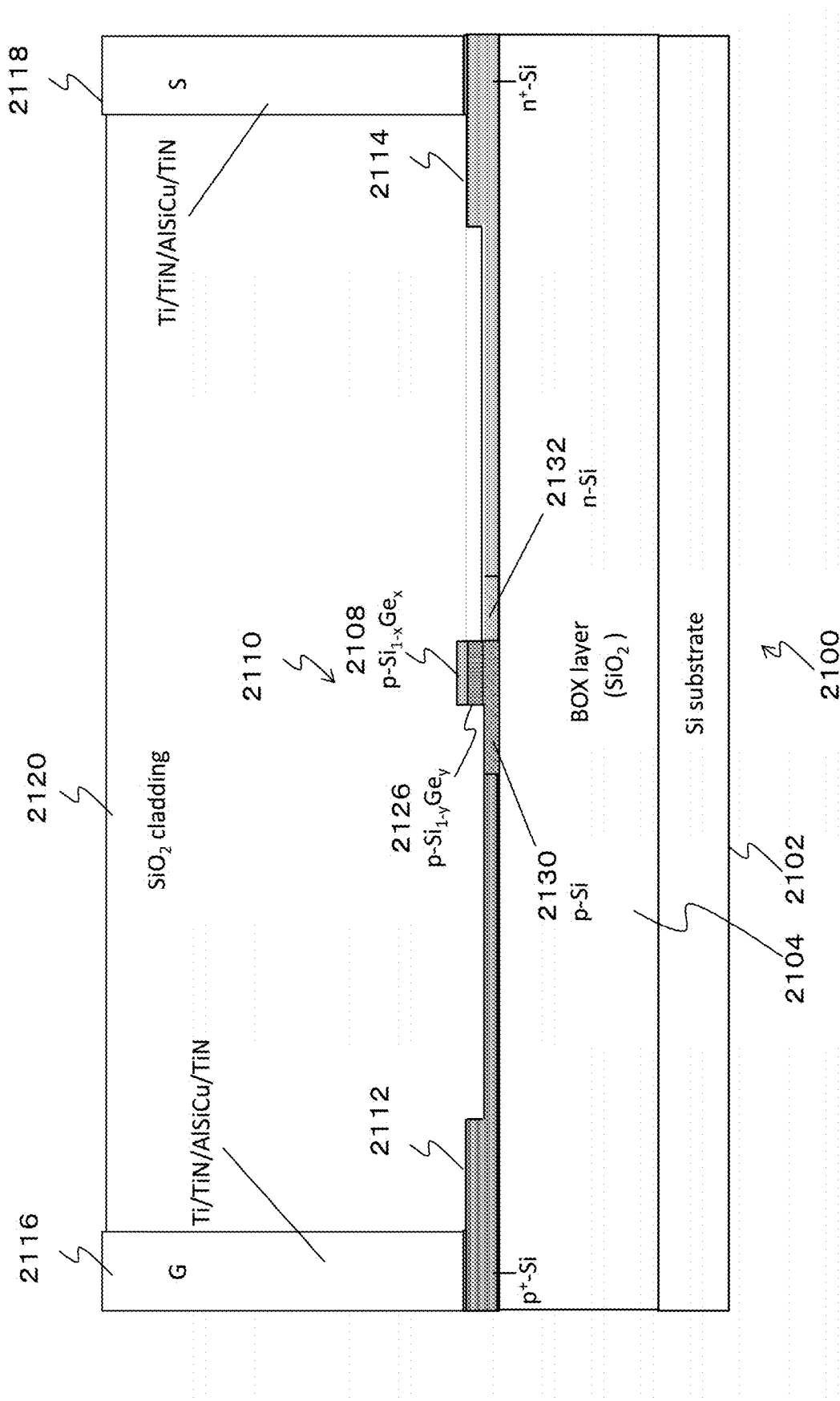
FIG. 22 schematically shows a cross-section view of the optical phase modulator shown in FIG. 21.
Figure 23:
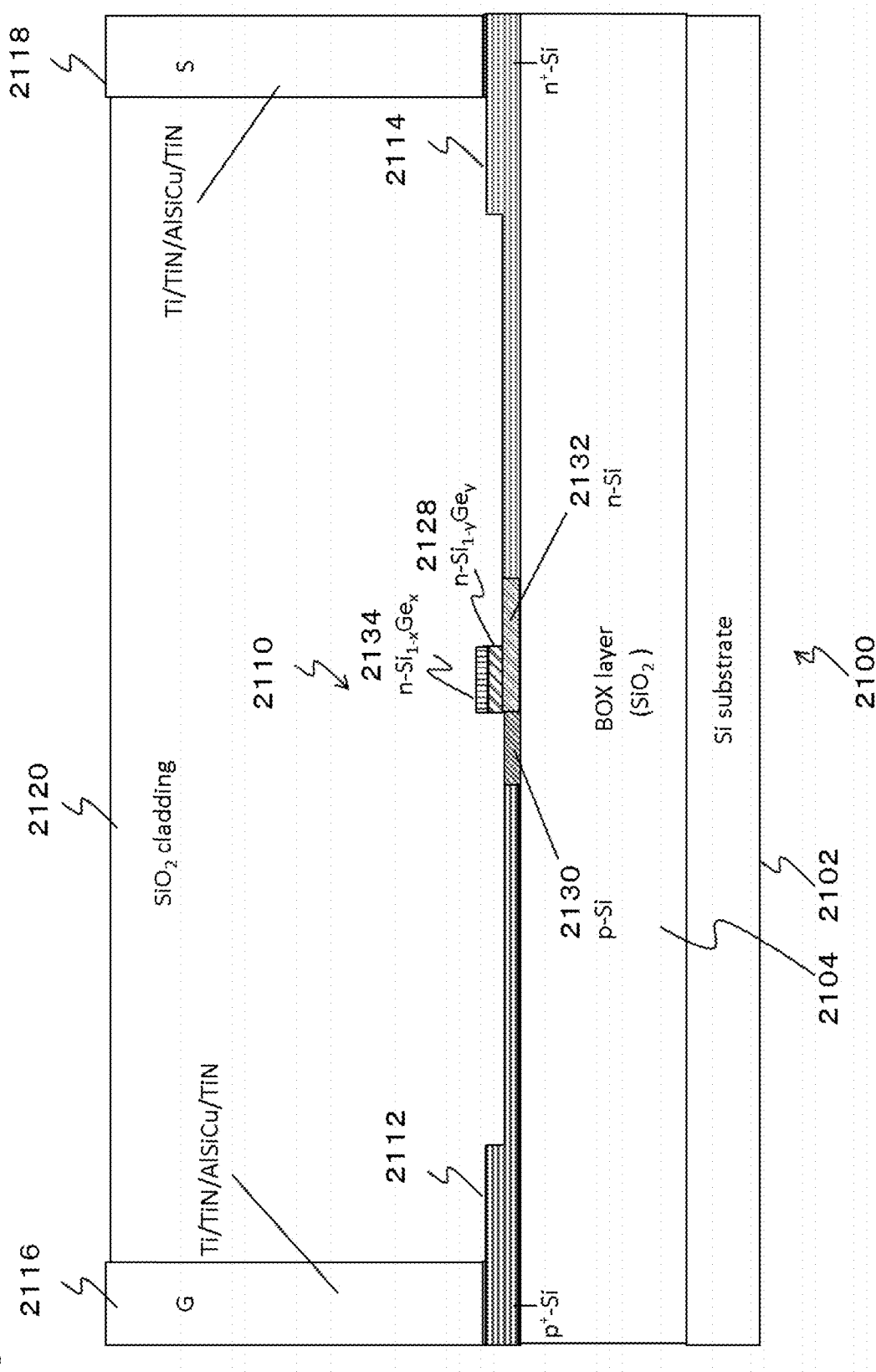
FIG. 23 schematically shows a cross-section view of the optical phase modulator shown in FIG. 21.

Each of FIGS. 22 and 23 schematically shows a cross-section view of the optical phase modulator 2100 shown in FIG. 21. FIG. 22 corresponds to a cross-section view at line A-A' in FIG. 21, and FIG. 23 corresponds to a cross-section view at line B-B' in FIG. 21; and, in FIG. 22, the p-type $Si_{1-y}Ge_y$ layers 2126 and the p-type $Si_{1-x}Ge_x$ layer 2108 are formed. The p-type Si region 2130 extends up to the right edge of the p-type $Si_{1-x}Ge_x$ layer 2108. On the other hand, the n-type $Si_{1-y}Ge_y$ layer 2128 and the n-type $Si_{1-x}Ge_x$ layer 2134 are formed in FIG. 23. The n-type Si region 2132 extends up to the left edge of the n-type $Si_{1-x}Ge_x$ layer 2134. Further, each of FIGS. 22 and 23 shows the Si substrate 2102, the BOX layer 2104, a rib-type waveguide structure 2110, the first electrode 2112, the second electrode 2114, a ground electrode 2116, a signal electrode 2118, and a cladding 2120.

According to the embodiment shown in FIGS. 21-23, it becomes possible to improve overlap between an optical field and a carrier-density-modulated region.

An embodiment of the present invention is an optical intensity modulator comprising an optical phase modulator according to an embodiment of the present invention such as that explained above. For example, an optical intensity modulator can be constructed by using, for example, the optical phase modulator 100 shown in FIG. 1 in one arm or both arms of a Mach-Zehnder interferometer. An optical phase modulator according to another embodiment of the present invention may also be used for constructing an optical intensity modulator. A construction of an optical intensity modulator according to an embodiment of the present invention is not limited to the above-described construction. It will be understood that an optical intensity modulator having a characteristic of the present invention can be constructed by applying, by use of a method known to a person skilled in the art, an optical phase modulator according to the present invention to an optical intensity modulator.

FIGS. 24A to 24H are figures for explaining processes for manufacturing the optical phase modulator 100 according to the embodiment of the present invention shown in FIG. 1.

Figure 24A:
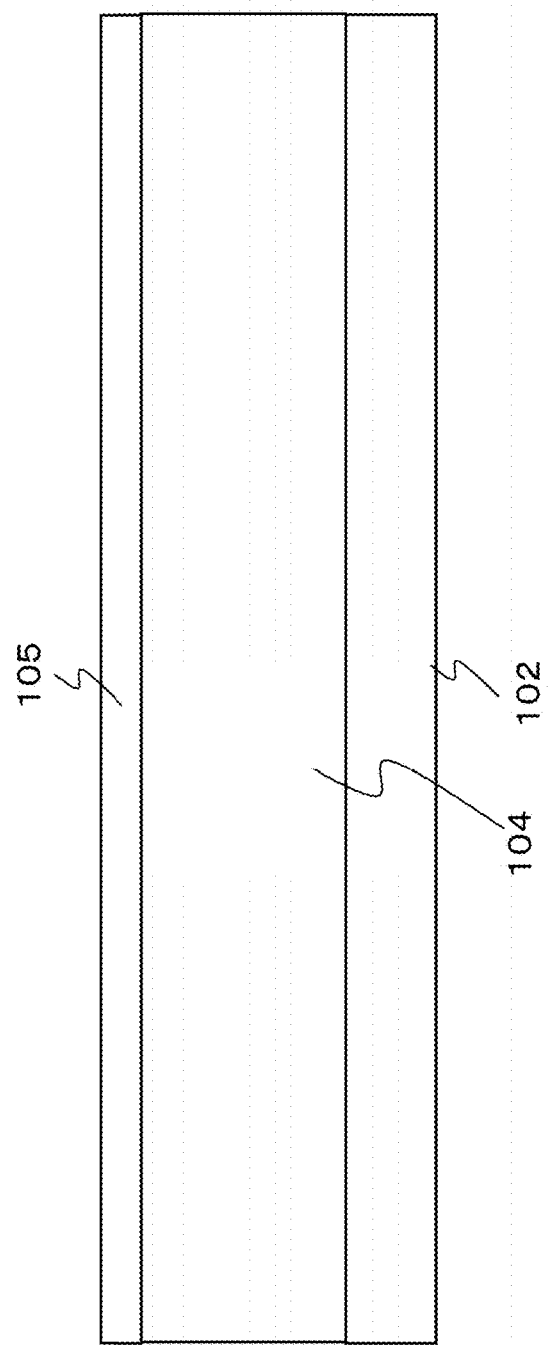
FIG. 24A is a figure for explaining a process for manufacturing the optical phase modulator according to the embodiment of the present invention shown in FIG. 1.

FIG. 24A shows a construction of the substrate used in the embodiment of the present invention. It comprises an SOI substrate wherein the Si layer 105 is stacked on the BOX layer (a thermal oxide film) 104 which is stacked on the Si substrate 102.

In FIG. 24B, the p-type Si region 130 is formed by applying a doping process (in which boron is used, for example) to a part of the Si layer 105. Also, the n-type Si region 132 is formed by applying a doping process (in which phosphorus is used, for example) to a different part of the Si layer 105. As a result, the PN junction 106, which comprises Si and is formed in a lateral direction on the substrate, is formed. The PN junction may comprise $Si_{1-y}Ge_y$ layer. A PIN junction may be formed instead of the PN junction.

Figure 24C:
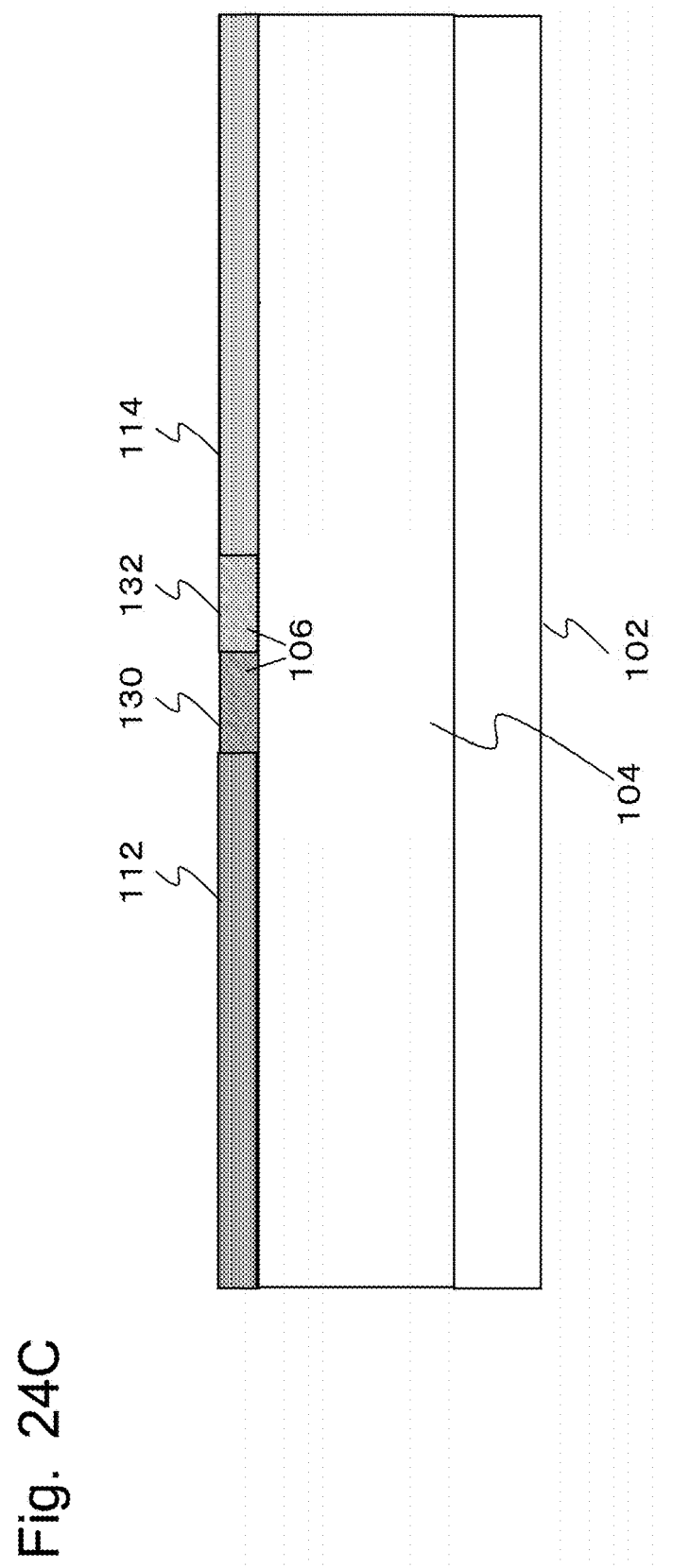
FIG. 24C is a figure for explaining a process for manufacturing the optical phase modulator according to the embodiment of the present invention shown in FIG. 1.

In FIG. 24C, the p-type electrode 112 is formed by further applying a p-type doping process to a part of the p-type Si region 130 that is adjacent to the PN junction 106, to thereby increase doping concentration of the part. Also, the n-type electrode 114 is formed by further applying an n-type doping process to a part of the n-type Si region 132 that is adjacent to the PN junction 106, to thereby increase doping concentration of the part.

Figure 24D:
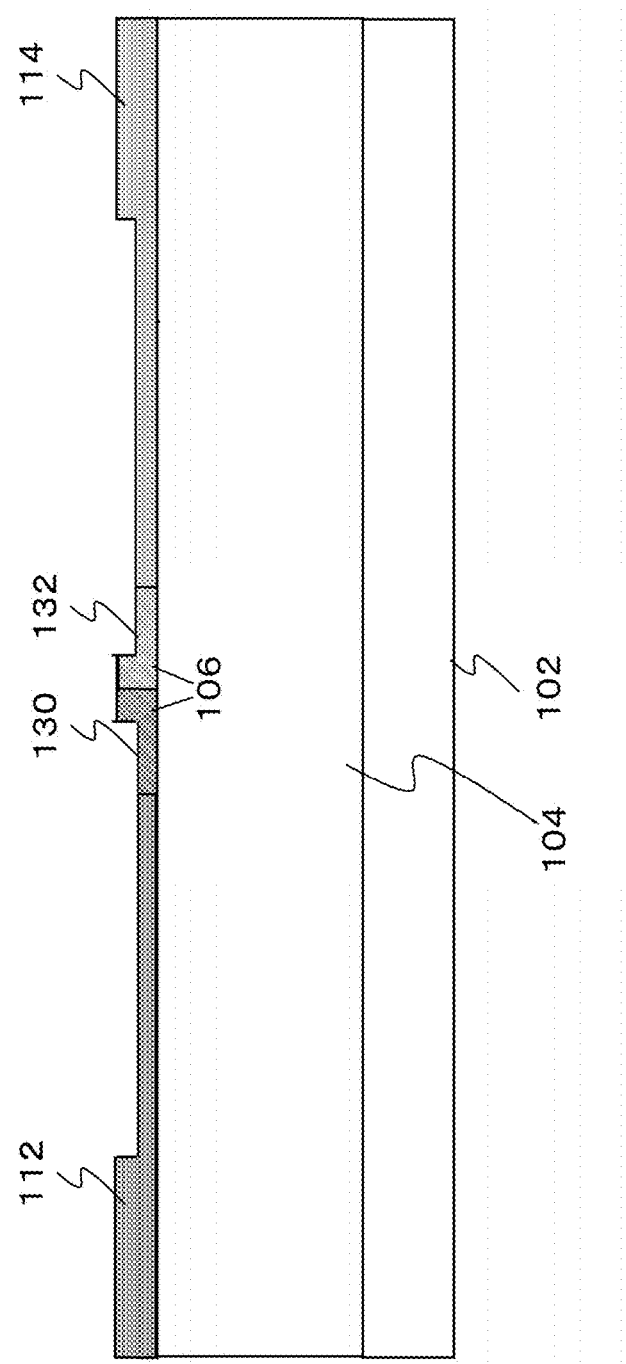
FIG. 24D is a figure for explaining a process for manufacturing the optical phase modulator according to the embodiment of the present invention shown in FIG. 1.

In FIG. 24D, parts of the PN junction 106, the p-type electrode 112, and the n-type electrode 114 are etched.

Figure 24E:
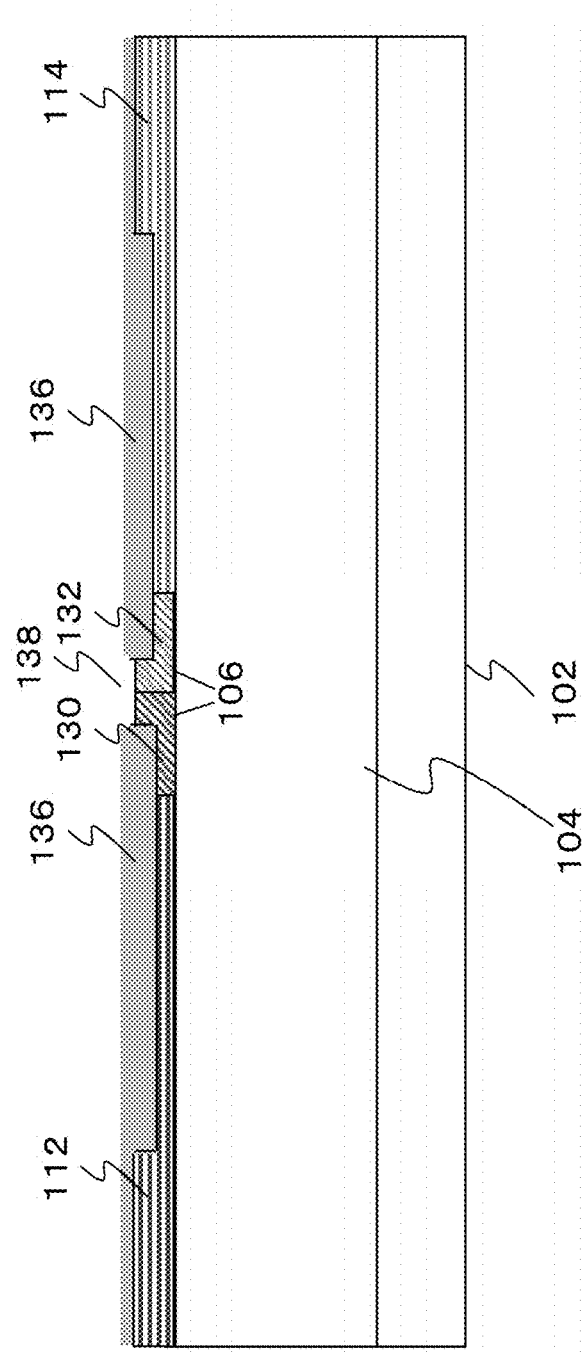
FIG. 24E is a figure for explaining a process for manufacturing the optical phase modulator according to the embodiment of the present invention shown in FIG. 1.

In FIG. 24E, an oxide-film mask layer 136 is formed on the etched parts. Further, a part of the oxide-film mask layer, which is on the PN junction 106, is removed, and a concavity 138 is formed.

Figure 24F:
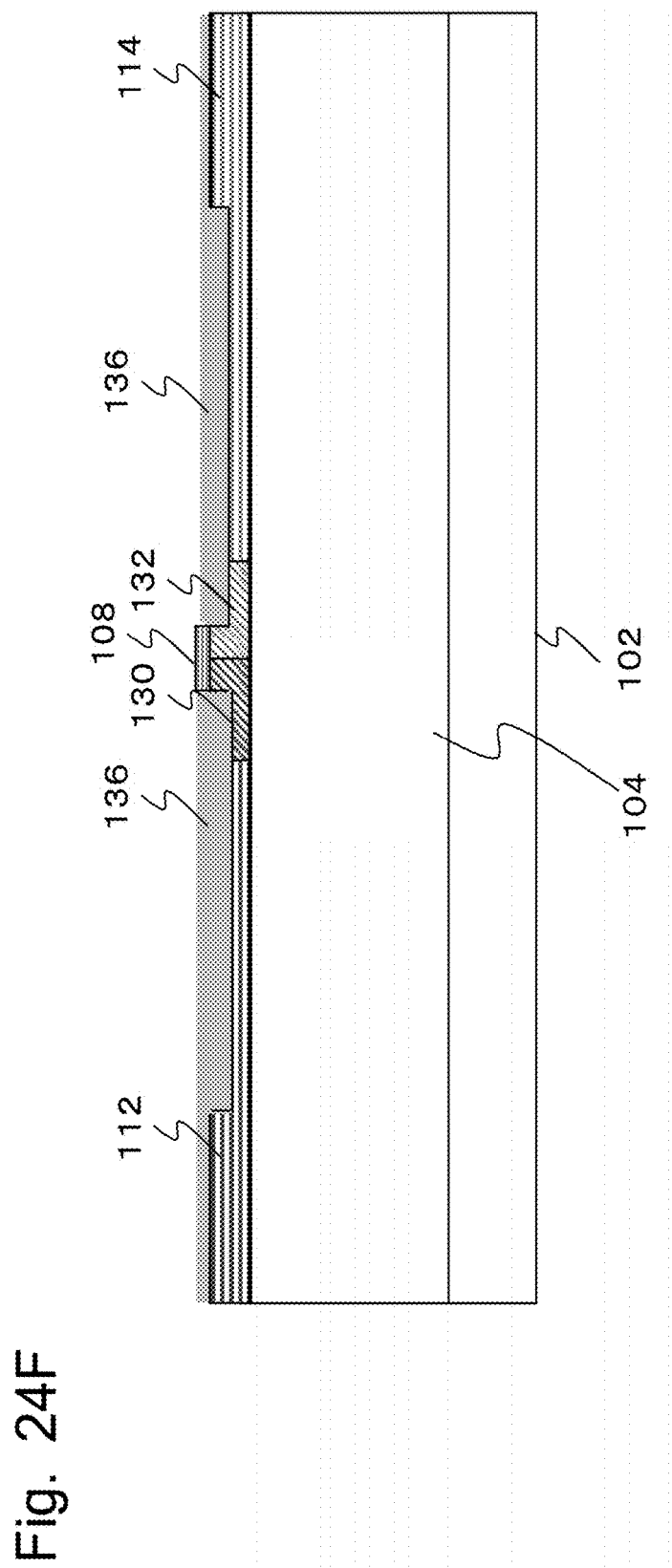
FIG. 24F is a figure for explaining a process for manufacturing the optical phase modulator according to the embodiment of the present invention shown in FIG. 1.

In FIG. 24F, a $Si_{1-x}Ge_x$ layer comprising at least one layer is formed on the concavity 138, and the p-type $Si_{1-x}Ge_x$ layer 108 is formed by applying a p-type doping to the above $Si_{1-x}Ge_x$ layer. Thus, the p-type $Si_{1-x}Ge_x$ layer 108 is electrically connected to the PN junction 106.

Figure 24G:
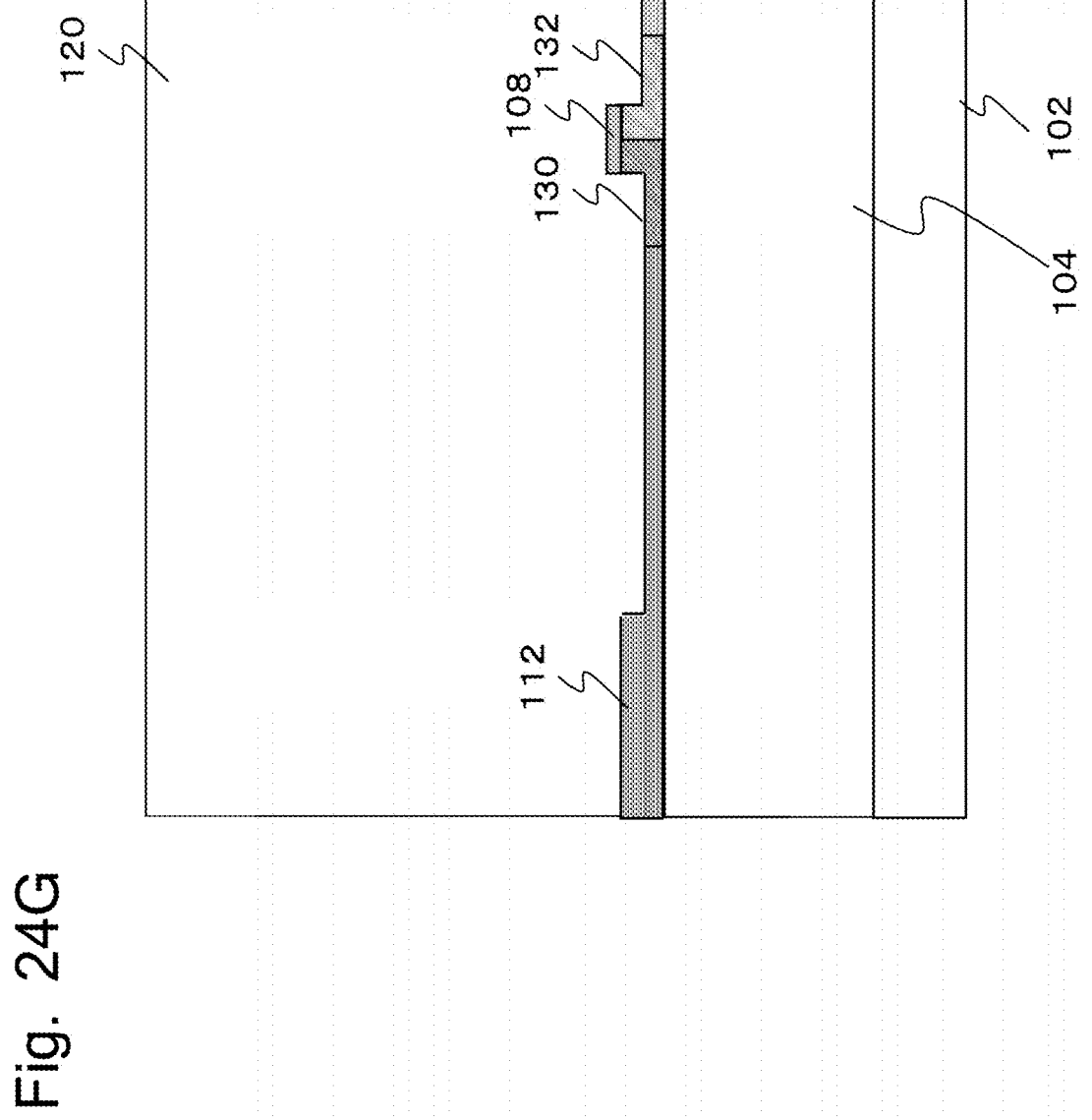
FIG. 24G is a figure for explaining a process for manufacturing the optical phase modulator according to the embodiment of the present invention shown in FIG. 1.

In FIG. 24G, the oxide-film mask layer 136 is removed, and the oxide-film (for example, $SiO_2$) cladding layer 120 is formed.

Figure 24H:
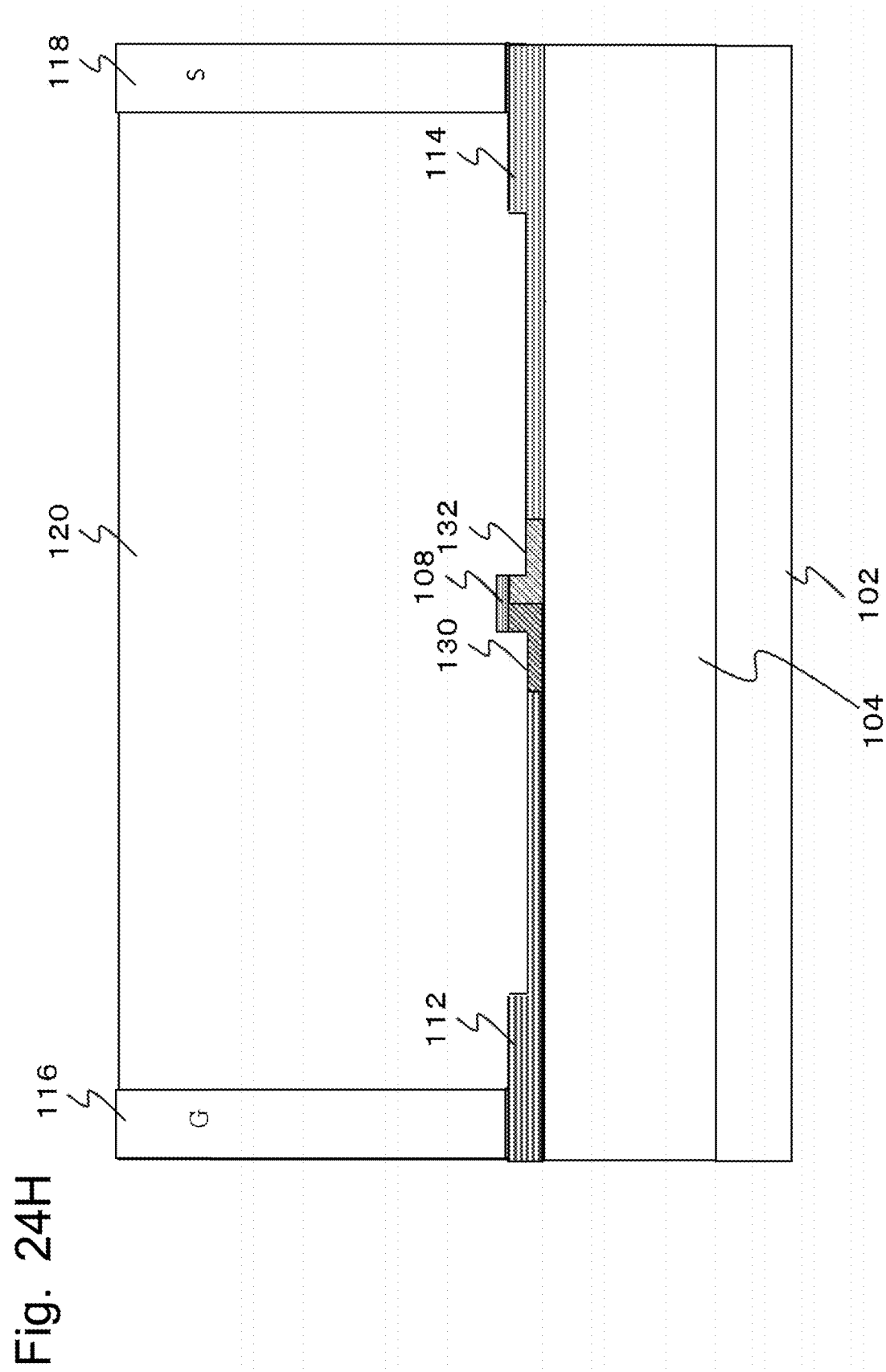
FIG. 24H is a figure for explaining a process for manufacturing the optical phase modulator according to the embodiment of the present invention shown in FIG. 1.
Figure 25:
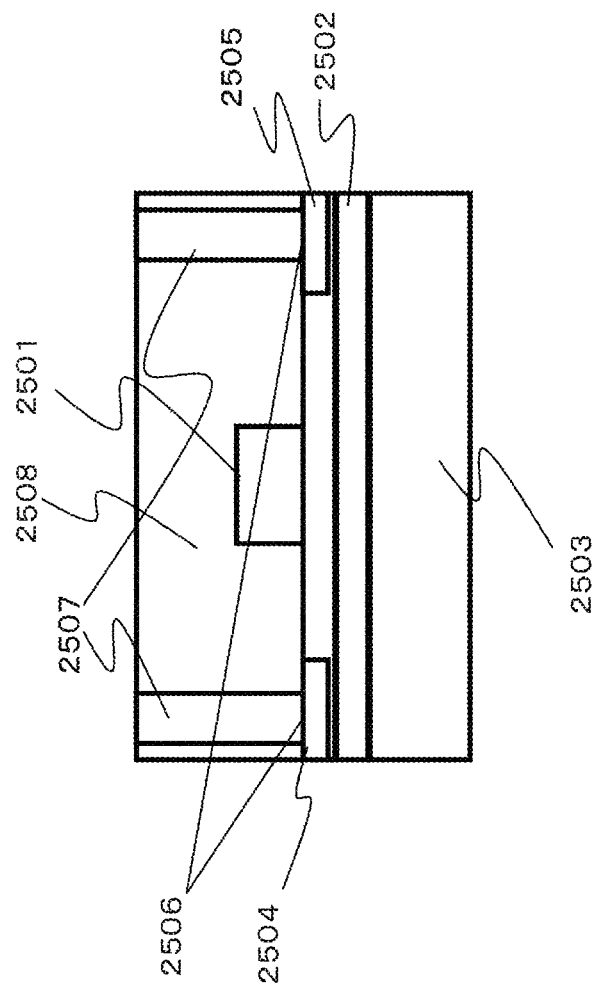
FIG. 25 shows a typical example of a prior-art silicon-based electro-optic phase modulator.

In FIG. 24H, the ground electrode 116 and the signal electrode 118 are formed by use of metal wires in such a manner that they contact the p-type electrode 112 and the n-type electrode 114, respectively.

Although the present invention is explained with reference to specific embodiments, it is intended that the embodiments described in this specification are not used to interpret the present invention in a limiting way, and that the embodiments described in this specification are used as examples to explain the present invention. It is obvious for a person skilled in the art that other alternative embodiments can be implemented without departing from the scope of the present invention.

The invention claimed is:

1. An optical phase modulator comprising a rib-type waveguide structure and a cladding,
    wherein the rib-type waveguide structure comprises:
        a PN junction or a PIN junction that comprises Si or $Si_{1-y}Ge_y$ and is formed in a lateral direction on a substrate; and
        a $Si_{1-x}Ge_x$ layer that comprises at least one layer, is doped by an impurity to exhibit a first conductivity type or a second conductivity type, and is stacked on the PN junction or the PIN junction to be electrically connected to the PN junction or the PIN junction and in contact with both sides of the PN junction or the PIN junction, and
    wherein the cladding is in contact with the $Si_{1-x}Ge_x$ layer and the substrate.

2. The optical phase modulator according to claim 1, comprising:
    a first electrode of the first conductivity type and a second electrode of the second conductivity type that are adjacent to the rib-type waveguide structure,
    wherein carrier density in the rib-type waveguide structure is changed by application of a voltage to the first electrode and the second electrode.

3. The optical phase modulator according to claim 1, wherein the $Si_{1-x}Ge_x$ layer comprising at least one layer has a lattice strain.

4. The optical phase modulator according to claim 1, wherein the PN junction or the PIN junction formed in the lateral direction on the substrate comprises a layered structure comprising a PN junction or a PIN junction comprising Si and a PN junction or a PIN junction comprising $Si_{1-y}Ge_y$.

5. The optical phase modulator according to claim 4, wherein the PN junction or the PIN junction, which comprises the layered structure of Si and $Si_{1-y}Ge_y$ that is formed in the lateral direction on the substrate, comprises a rib-type waveguide structure.

6. The optical phase modulator according to claim 1, wherein the $Si_{1-x}Ge_x$ layer comprising at least one layer comprises:
    a $Si_{1-x1}Ge_{x1}$ layer stacked on the PN junction or the PIN junction; and a $Si_{1-x2}Ge_{x2}$ layer stacked on the $Si_{1-x1}Ge_{x1}$ layer, wherein x2 is smaller than x1.

7. The optical phase modulator according to claim 1, wherein the $Si_{1-x}Ge_x$ layer comprising at least one layer comprises a strain induction film formed above the $Si_{1-x}Ge_x$ layer or on a side of the $Si_{1-x}Ge_x$ layer.

8. The optical phase modulator according to claim 1, wherein, in the PN junction or the PIN junction formed in the lateral direction on the substrate, or in the $Si_{1-x}Ge_x$ layer comprising at least one layer and stacked on the PN junction or the PIN junction to be electrically connected to the PN junction or the PIN junction, doping concentration of the first conductivity type is lower than doping concentration of the second conductivity type.

9. The optical phase modulator according to claim 8, wherein the first conductivity type is a p type, and the second conductivity type is an n type.

10. The optical phase modulator according to claim 1, wherein the PN junction or the PIN junction comprises a plurality of PN junctions or a plurality of PIN junctions that are formed in a periodic manner or an aperiodic manner along a direction of propagation of light.

11. The optical phase modulator according to claim 10, wherein, corresponding to junction positions of the plurality of PN junctions or the plurality of PIN junctions that are formed in a periodic manner or an aperiodic manner, a conductivity type of the $Si_{1-x}Ge_x$ layer comprising at least one layer stacked on the PN junction or the PIN junction changes, in an alternating manner, between the first conductivity type and the second conductivity type.

12. An optical intensity modulator comprising the optical phase modulator according to claim 1.

13. A method for manufacturing an optical phase modulator, comprising:
   forming a PN junction or a PIN junction that comprises Si or $Si_{1-y}Ge_y$ and is formed in a lateral direction;
   doping regions adjacent to the PN junction or the PIN junction with a first conductivity type and a second conductivity type to form a first electrode of a first conductivity type and a second electrode of a second conductivity type; and
   forming, on the PN junction or the PIN junction, an $Si_{1-x}Ge_x$ layer that comprises at least one layer, is doped by an impurity to exhibit the first conductivity type or the second conductivity type, and is electrically connected to the PN junction or the PIN junction and in contact with both sides of the PN junction or the PIN junction; and
   forming a cladding layer that is in contact with the $Si_{1-x}Ge_x$ layer and the substrate.

14. The method for manufacturing the optical phase modulator according to claim 13, wherein the forming the $Si_{1-x}Ge_x$ layer comprising at least one layer comprises forming a concavity in the PN junction or the PIN junction and forming an $Si_{1-x}Ge_x$ layer comprising at least one layer on the concavity.

* * * * *

UNITED STATES PATENT AND TRADEMARK OFFICE
CERTIFICATE OF CORRECTION

PATENT NO. : 10,146,070 B2
APPLICATION NO. : 15/548687
DATED : December 4, 2018
INVENTOR(S) : Junichi Fujikata et al.

Page 1 of 1

It is certified that error appears in the above-identified patent and that said Letters Patent is hereby corrected as shown below:

On the Title Page

At (73):
Please replace "PHOTONICS ELECTRONICS TECHNOLOGY RESEARCH ASSOCIATION, Tokyo (JP)"
With -- PHOTONICS ELECTRONICS TECHNOLOGY RESEARCH ASSOCIATION, Tokyo (JP); THE UNIVERSITY OF TOKYO, Tokyo (JP) --

Signed and Sealed this
Sixteenth Day of April, 2019

Andrei Iancu
*Director of the United States Patent and Trademark Office*